(12) United States Patent
Gross et al.

(10) Patent No.: US 10,469,235 B2
(45) Date of Patent: Nov. 5, 2019

(54) METHODS AND SYSTEMS FOR NETWORK ADDRESS LOOKUP ENGINES

(71) Applicant: THE ROYAL INSTITUTION FOR THE ADVANCEMENT OF LEARNING/MCGILL UNIVERSITY, Montreal (CA)

(72) Inventors: Warren Gross, Cote-St-Luc (CA); Naoya Onizawa, Montreal (CA)

(73) Assignee: THE ROYAL INSTITUTION FOR THE ADVANCEMENT OF LEARNING/MCGILL UNIVERSITY, Montreal (CA)

(*) Notice: Subject to any disclaimer, the term of this patent is extended or adjusted under 35 U.S.C. 154(b) by 0 days.

(21) Appl. No.: 15/211,335

(22) Filed: Jul. 15, 2016

(65) Prior Publication Data

US 2019/0222398 A1  Jul. 18, 2019

Related U.S. Application Data

(63) Continuation of application No. 14/175,108, filed on Feb. 7, 2014, now abandoned.
(Continued)

(51) Int. Cl.
*H04L 5/00* (2006.01)
*H04L 1/00* (2006.01)
(Continued)

(52) U.S. Cl.
CPC ............ *H04L 5/0057* (2013.01); *H04J 11/00* (2013.01); *H04J 13/0048* (2013.01); *H04J 13/12* (2013.01);
(Continued)

(58) Field of Classification Search
CPC ... H04L 5/0057; H04L 1/0026; H04L 1/0029; H04L 5/0016; H04L 5/0044;
(Continued)

(56) References Cited

U.S. PATENT DOCUMENTS

| 7,707,217 B2 | 4/2010 | Allwright et al. |
| 7,730,086 B1 * | 6/2010 | Phoha .................. H04L 67/1008 706/15 |
| 9,877,337 B2 * | 1/2018 | Seo ........................ H04W 76/14 |

OTHER PUBLICATIONS

Gamache et. al., "A Fast Ternary CAM Design for IP Networking Applications", Proc. 12th International Conference Computer Communications and Networks, Oct. 2003, pp. 434-439, Institute of Electrical and Electronic Engineers.
(Continued)

*Primary Examiner* — Kashif Siddiqui
(74) *Attorney, Agent, or Firm* — Norton Rose Fulbright Canada LLP

(57) ABSTRACT

Internet routers are a key component in today's Internet. Each router forwards received packets toward their final destinations based upon a Longest Prefix Matching (LPM) algorithm select an entry from a routing table that determines the closest location to the final packet destination among several candidates. Prior art solutions to LPM lookup offer different tradeoffs and that it would be beneficial for a design methodology that provides for low power large scale IP lookup engines addressing the limitations within the prior art. According to embodiments of the invention a low-power large-scale IP lookup engine may be implemented exploiting clustered neural networks (CNNs). In addition to reduced power consumption embodiments of the invention provide reduced transistor count providing for reduced semiconductor die footprints and hence reduced die cost.

17 Claims, 17 Drawing Sheets

Related U.S. Application Data

(60) Provisional application No. 61/761,998, filed on Feb. 7, 2013.

(51) Int. Cl.
  *H04J 13/00* (2011.01)
  *H04J 11/00* (2006.01)
  *H04J 13/12* (2011.01)
  *H04B 1/707* (2011.01)
  *H04L 1/16* (2006.01)

(52) U.S. Cl.
  CPC .......... *H04L 1/0026* (2013.01); *H04L 1/0029* (2013.01); *H04L 5/005* (2013.01); *H04L 5/006* (2013.01); *H04L 5/0016* (2013.01); *H04L 5/0044* (2013.01); *H04L 5/0048* (2013.01); *H04L 5/0055* (2013.01); *H04L 5/0094* (2013.01); *H04B 1/707* (2013.01); *H04L 1/0057* (2013.01); *H04L 1/1607* (2013.01); *H04L 5/0007* (2013.01); *H04L 5/0053* (2013.01)

(58) Field of Classification Search
  CPC ..... H04L 5/0048; H04L 5/005; H04L 5/0055; H04L 5/006; H04L 5/0094; H04L 1/0057; H04L 1/1607; H04L 5/0007; H04L 5/0053; H04J 11/00; H04J 13/0048; H04J 13/12; H04B 1/707
  See application file for complete search history.

(56) References Cited

OTHER PUBLICATIONS

Noda et. al., "A Cost-Efficient High-Performance Dynamic TCAM with Pipelined Hierarchical Searching and Shift Redundancy Architecture," J. Solid State Circuits, Jan. 2005, vol. 40, No. 1, pp. 245-253, Institute of Electrical and Electronic Engineers.

Maurya et. al., "A Dynamic Longest Prefix Matching Content Addressable Memory for IP Routing," Trans. Very Large Scale Integration, Jun. 2011, vol. 19, No. 6, pp. 963-972, Institute of Electrical and Electronic Engineers.

Kuroda et. al., "A 200Msps, 0.6W eDRAM-based Search Engine Applying Full-Route Capacity Dedicated FIB Application", Proc. 2012 Custom Integrated Circuits Conference, Sep. 2012, pp. 1-4, Institute of Electrical and Electronic Engineers.

Eatherton et al., "Tree bitmap: hardware/software IP lookups with incremental updates," ACM SIGCOMM Comput. Commun. Rev., Apr. 2004, vol. 34, No. 2, pp. 97-122, Association for Computing Machinery.

Bando et. al., "FlashTrie: Beyond 100-Gb/s IP Route Lookup using Hash-based Prefix-Compressed Trie," Trans. Networking, Aug. 2012, vol. 20, No. 4, pp. 1262-1275, Institute of Electrical and Electronic Engineers / Association for Computing Machinery.

Hasan et. al., "Chisel: A Storage-Efficient, Collision-Free Hash-based Network Processing Architecture" ACM SIGARCH Computer Architecture News, Jun. 2006, vol. 34, No. 2, pp. 203-215, IEEE Computer Society.

Dharmapurikar et al., "Longest Prefix Matching using Bloom Flters," IEEE/ACM Trans. Networking, Apr. 2006, vol. 14, No. 2, pp. 397-409, Institute of Electrical and Electronic Engineers / Association for Computing Machinery.

Gripon et al., "Sparse Neural Networks with Large Learning Diversity," IEEE Trans. Neural Networks, Jul. 2011, vol. 22, No. 7, pp. 1087-1096, Institute of Electrical and Electronic Engineers.

Hopfield, "Neural Networks and Physical Systems with Emergent Collective Computational Abilities", Proc. National Academy of Sciences, Apr. 1982, vol. 79, No. 8, pp. 2554-2558, US National Academy of Sciences.

Jarollahi et. al., "Architecture and Implementation of an Associative Memory using Sparse Clustered Networks", IEEE Intnl. Sym. Circuits and Systems, May 2012, pp. 2901-2904, Institute of Electrical and Electronic Engineers.

Pagiamtzis et. al., "Content-Addressable Memory (CAM) Circuits and Architectures: A Tutorial and Survey", J. Solid State Circuits, Mar. 2006, vol. 41, No. 3, pp. 712-727, Institute of Electrical and Electronic Engineers.

Huang et al., "A 65nm 0.165 fJ/bit/search 256×144 TCAM Macro Design for IPv6 Lookup Tables," J. Solid State Circuits, Feb. 2011, vol. 46, No. 2, pp. 507-519, Institute of Electrical and Electronic Engineers.

\* cited by examiner

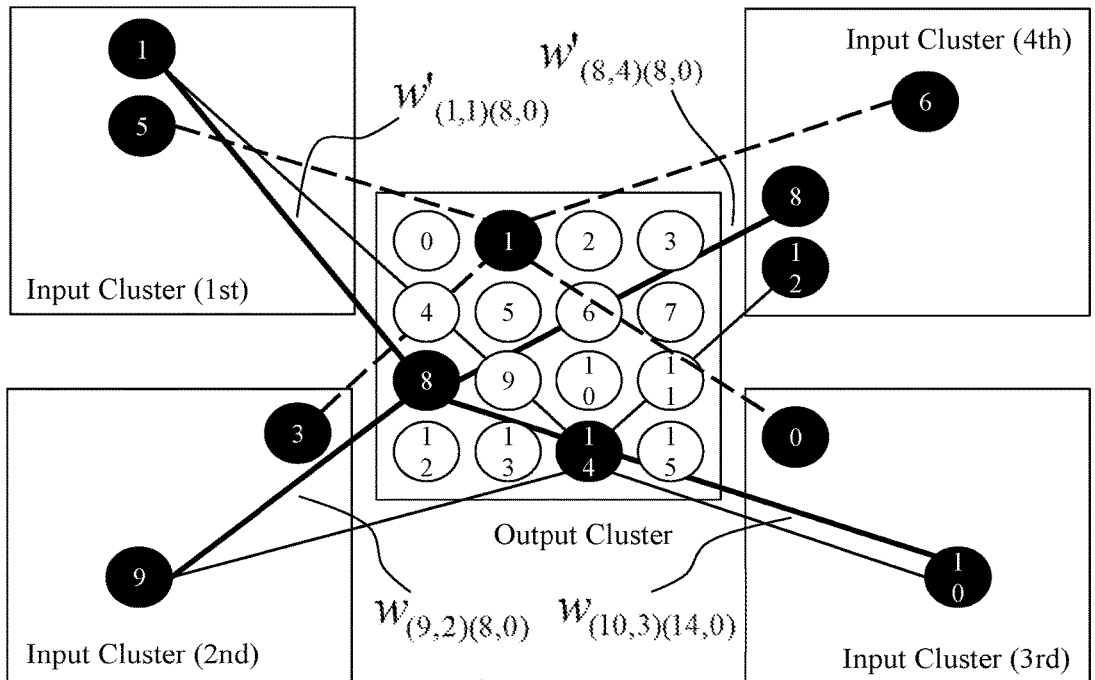
Figure 3C
Figure 4A
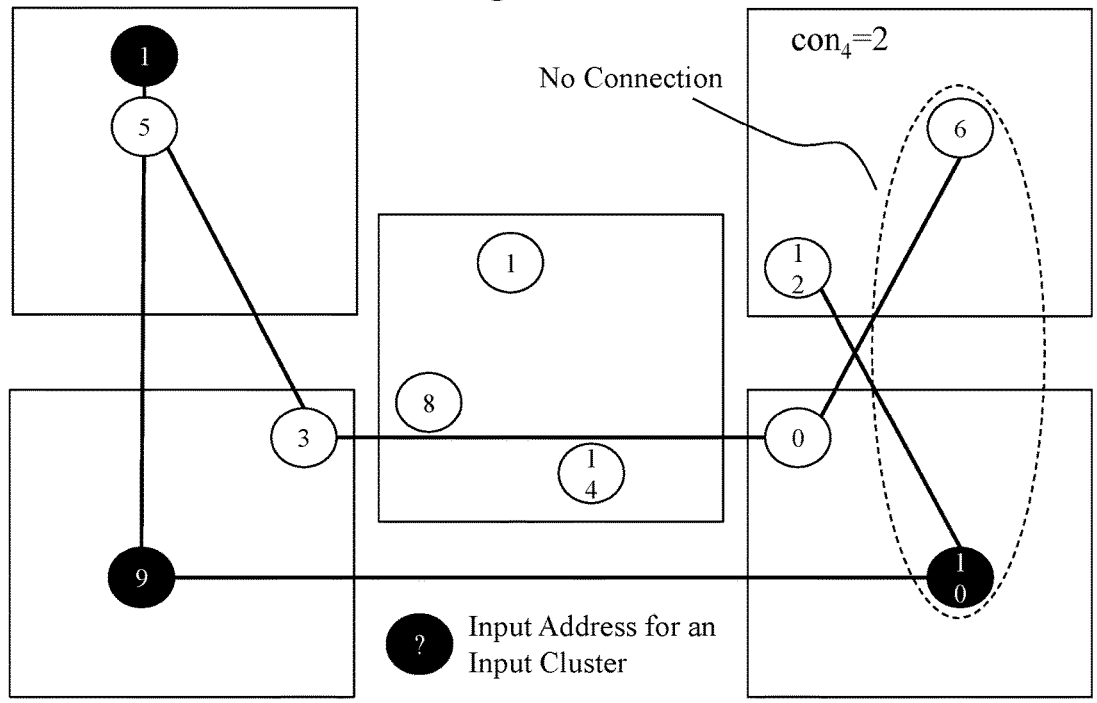

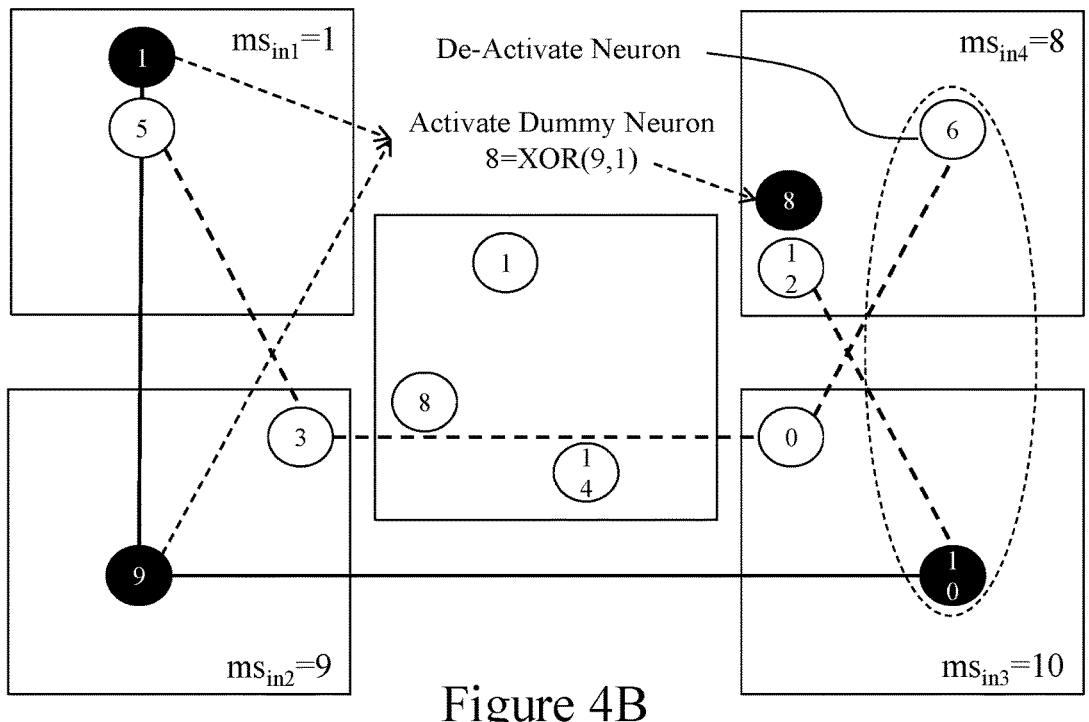
Figure 4B
Figure 4C
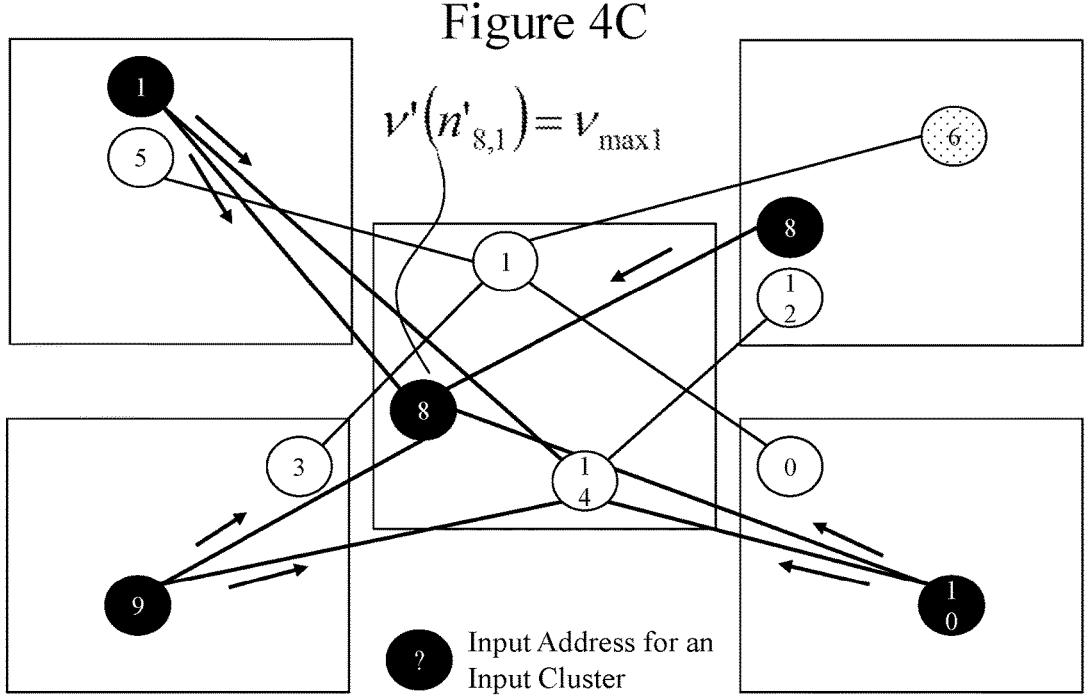

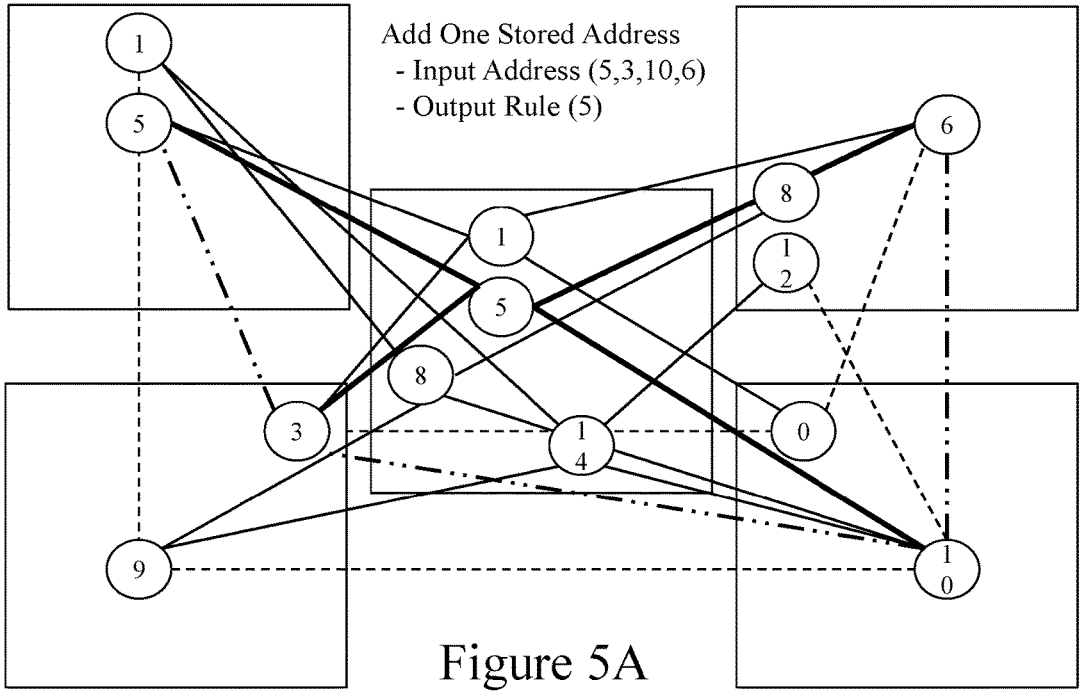
Figure 5A
Figure 5B
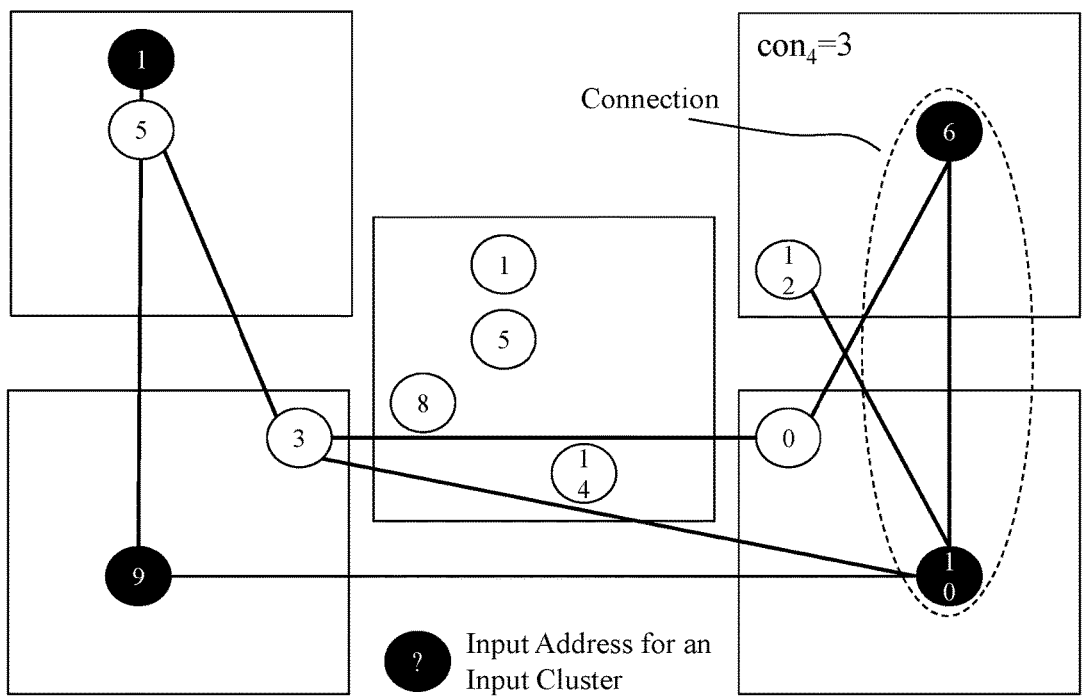

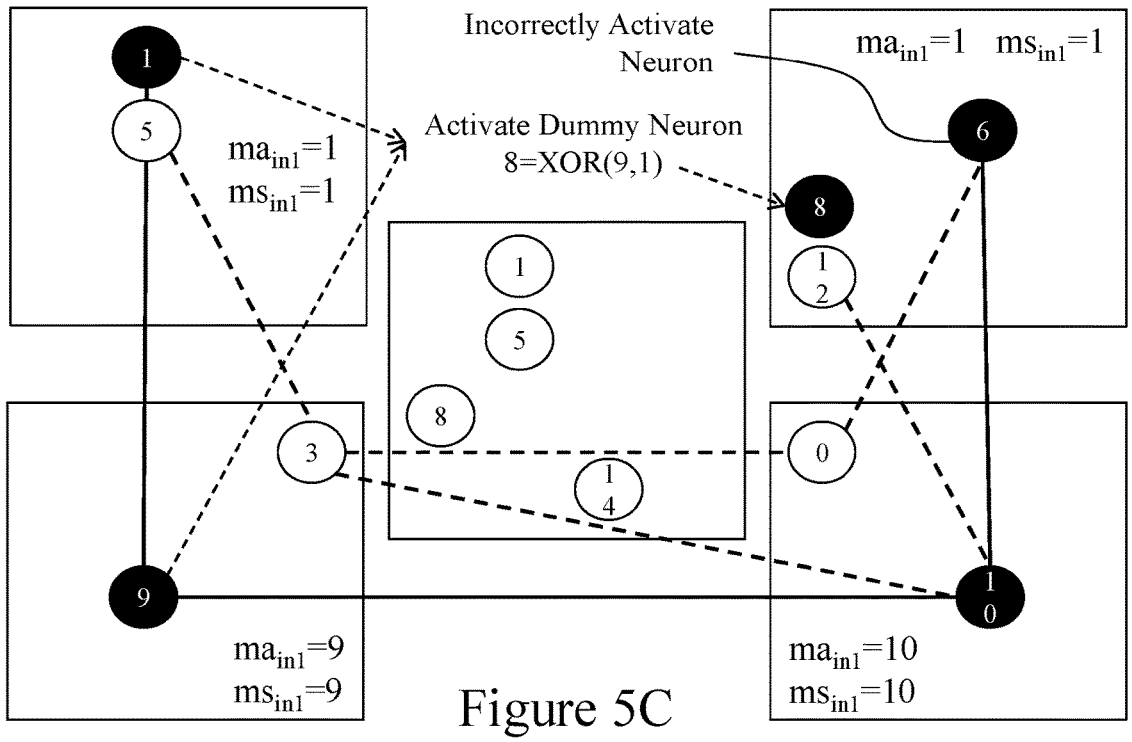
Figure 5C
Figure 5D
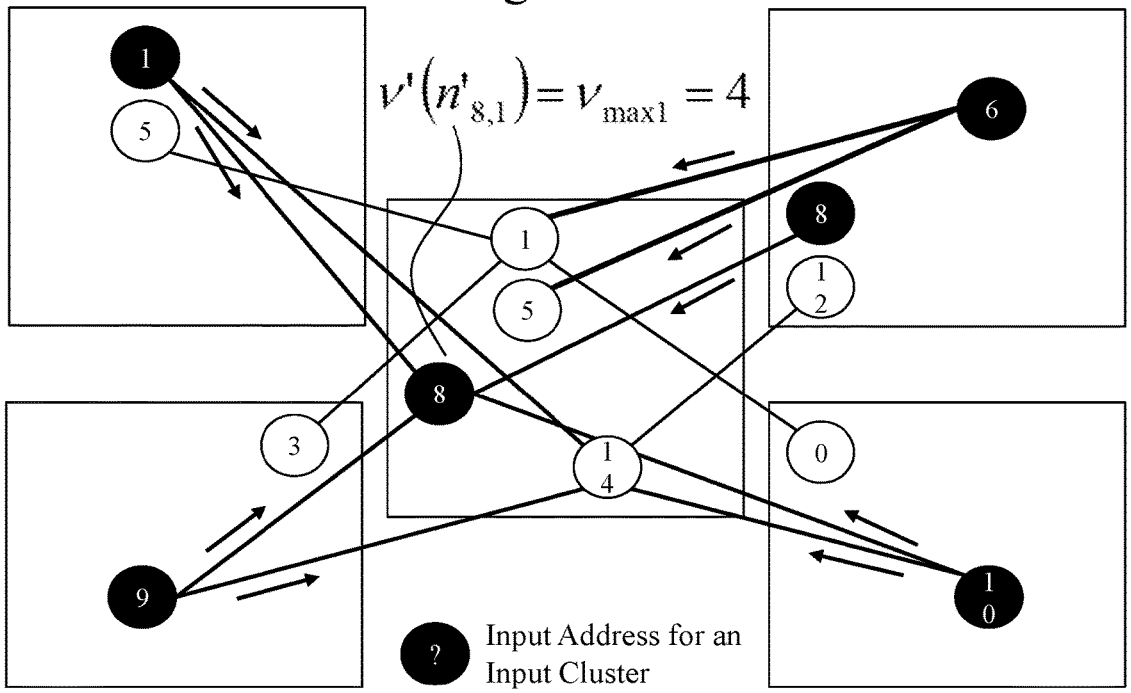

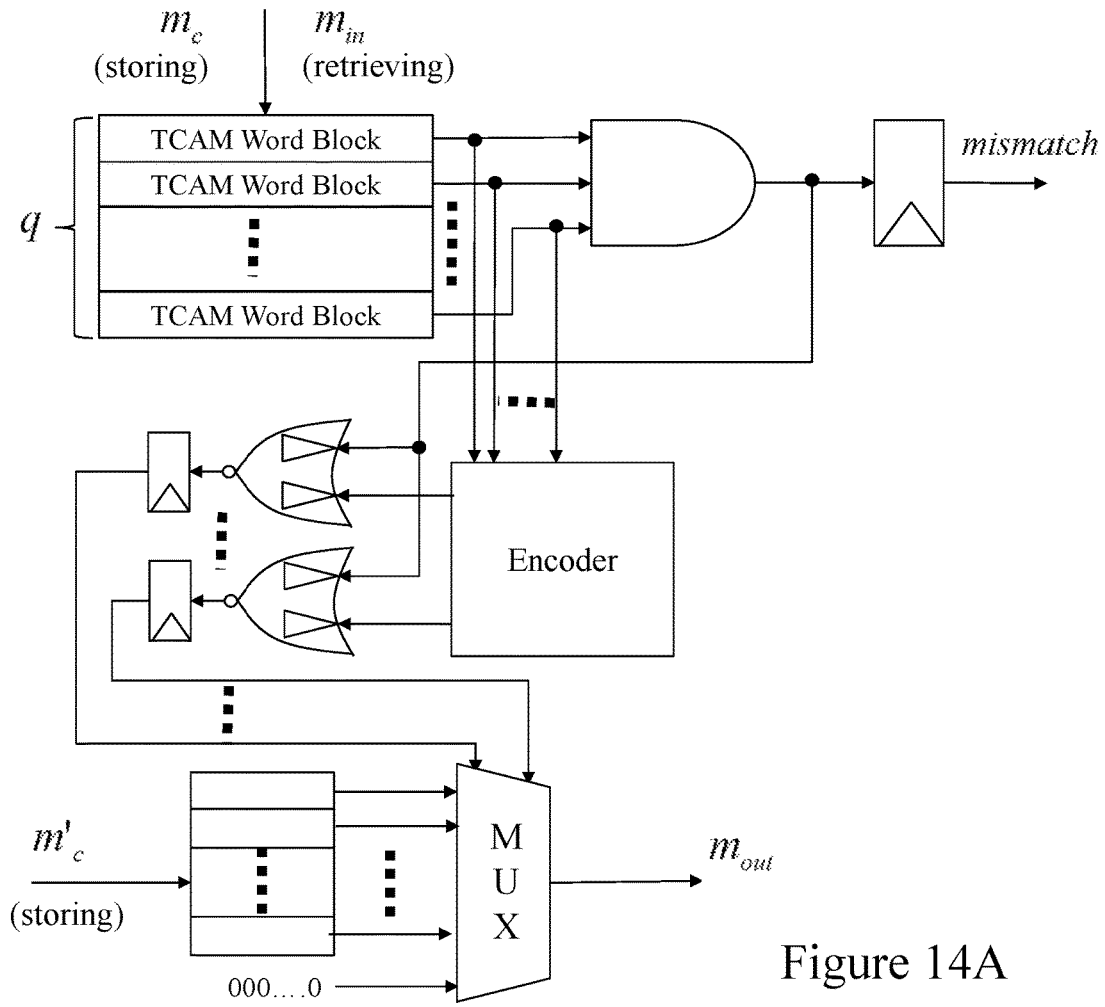
Figure 14A
Figure 14B
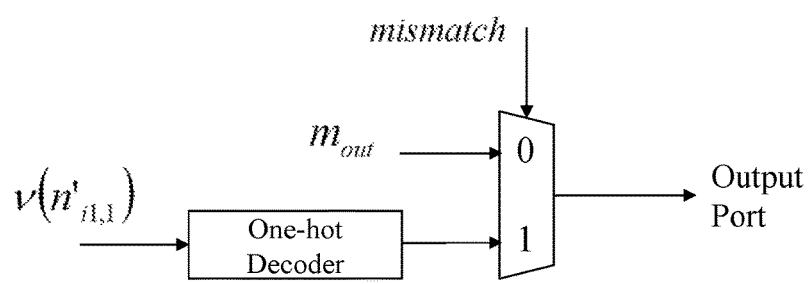

METHODS AND SYSTEMS FOR NETWORK ADDRESS LOOKUP ENGINES

CROSS-REFERENCE TO RELATED APPLICATIONS

This patent application claims the benefit of U.S. patent application Ser. No. 14/175,109 filed on Feb. 7, 2014 entitled "Methods and Systems for Network Address Lookup Engines" which itself claims priority from U.S. Provisional Patent Application 61/761,998 filed on Feb. 7, 2013 entitled "Methods and Systems for Network Address Lookup Engines."

FIELD OF THE INVENTION

This invention relates to address look-up engines and more particularly to address look-up engines with low power, die area efficiency, and compatibility with high speed packet datarates.

BACKGROUND OF THE INVENTION

In 2011 Cisco Systems 5th Annual Visual Networking Index Forecast the networking giant forecast that global Internet traffic will reach approximately 1 zettabyte a year by 2015 ($966 \times 10^{18}$). Breaking this down this equates to approximately 80 exabytes per month in 2015, up from approximately 20 exabytes per month in 2010, or 245 terabytes per second. This global Internet traffic will arise from approximately 3 billion people using approximately 6 billion portable and fixed electronic devices. At the same time average broadband access speeds will have increased to nearly 30 megabits per second from the approximately 7 megabits per second in 2011. This Internet traffic and consumer driven broadband access being supported through a variety of local, metropolitan, and wide area networks together with long haul, trunk, submarine, and backbone networks operating at OC-48 (2.5 Gb/s), OC-192 (10 Gb/s), OC-768 (40 Gb/s) with coarse and dense wavelength division multiplexing to provide overall channel capacities in some instances in excess of 1 Tb/s.

Dispersed between and within these networks are Internet routers which have become key to the Internet backbone. Such routers including, but not limited to, edge routers, subscriber edge routers, inter-provider border routers, and core routers. Accordingly, the overall data handled by these Internet routers by 2015 will be many times the approximately 1 zettabyte actually provided to users who will have expectations not only of high access speeds but low latency. Accordingly, Internet routers require fast IP-lookup operations utilizing hundred thousands of entries or more. Each router forwarding received packets toward their final destinations based upon a Longest Prefix Matching (LPM) algorithm to select an entry from a routing table that determines the closest location to the final packet destination among several candidates. As an entry in a routing table may be specify a network, one destination address may match more than one routing table entry. The most specific table entry, the one with the highest subnet mask, being called the longest prefix match. With the length of a packet being up to 32 bits for Internet Protocol version 4 (IPv4) and 144 bits for Internet Protocol version 6 (IPv6) it is evident that even at OC-48 (2.5 Gb/s) with maximum length IPv6 packets over 17 million packets are received per second. These packets containing binary strings and wildcards.

The hardware of the LPM has been designed within the prior art using several approaches including, but not limited to:

- Ternary Content-Addressable Memory (TCAM), see for example Gamache et. al. in "A fast ternary CAM design for IP networking applications" (Proc. 12th IEEE ICCCN, pp. 434-439), Noda et. al. in "A cost-efficient high-performance dynamic TCAM with pipelined hierarchical searching and shift redundancy architecture" (IEEE JSSC, Vol. 40, No. 1, pp. 245-253), Maurya et. al. in "A dynamic longest prefix matching content addressable memory for IP routing" (IEEE TVLSI, Vol. 19, No. 6, pp. 963-972), and Kuroda et. al. "A 200 Msps, 0.6 W eDRAM-based search engine applying full-route capacity dedicated FIB application" (Proc. CICC 2012, pp. 1-4);
- Trie-based schemes, see for example, Eatherton et al. "Tree bitmap: hardware/software IP lookups with incremental updates" (SIGCOMM Comput. Commun. Rev., Vol. 34, No. 2, pp. 97-122), and Bando et al "Flashtrie: Beyond 100-Gb/s IP route lookup using hash-based prefix-compressed trie" (IEEE/ACM Trans. Networking, Vol. 20, No. 4, pp. 1262-1275); and
- Hash-based schemes, see for example Hasan et. al. in "Chisel: A storage-efficient, collision-free hash-based network processing architecture" (Proc. 33rd ISCA, pp. 203-215, June 2006) and Dharmapurikar et al. in "Longest prefix matching using bloom filters" (IEEE/ACM Trans. Networking 2006, Vol. 14, No. 2, pp. 397-409).

Unlike random access memory (RAM) which RAM returns the data word stored at a supplied memory address a Content Addressable Memory (CAM) searches its entire memory to see if a data word supplied to it is stored anywhere within it. If the data word is found, the CAM returns a list of the one or more storage addresses where the word was found. A Ternary Content Addressable Memory (TCAM) allows a third matching state of "X" (or "Don't Care") in addition to "0" and "1" for one or more of the bits within the stored data word, thus adding flexibility to the search. Beneficially TCAMs perform the search of all entries stored in the TCAM cells in parallel and allow therefore for high-speed lookup operations. However, the large area of the cell, exploiting 16 transistors versus the 6 transistors in a static RAM (SRAM) cell and the brute-force searching methodology result in large power dissipation and inefficient hardware architectures for large forwarding tables. In contrast trie-based schemes exploit ordered tree data structures to store prefixes and locations based on this binary-tree structure that is created based on portions of stored Internet Protocol (IP) addresses. Searching is performed by traversing the tree until an LPM is found and may be implemented in hardware using SRAMs, rather than TCAMs, which potentially lowers power dissipation. However, deep trees require multi-step lookups slowing the determination of the LPM. Hash-based schemes use one or more hash tables to store prefixes where the benefit is scalability as table size is increased with length-independent searching speed. However, hash-based schemes have a possibility of collisions that requires post-processing to decide on only one output and requires reading many hash tables for each length of stored strings thereby slowing the process.

According, it would be evident that prior art solutions to LPM lookup offer different tradeoffs and that it would be beneficial for a design methodology that provides for low power large scale IP lookup engines addressing the limitations within the prior art. With carriers looking to add picocells, for example with ranges of a few hundred meters, to augment microcells and base stations in order to address capacity demands in dense urban environments for example power consumption becomes an important factor against conventional IP router deployment scenarios. According to embodiments of the invention a low-power large-scale IP lookup engine may be implemented exploiting clustered neural networks (CNNs). In addition to reduced power consumption embodiments of the invention provide reduced transistor count providing for reduced semiconductor die footprints and hence reduced die cost.

Beneficially low cost TCAMs would allow for their deployment within a variety of other applications where to date they have not been feasible due to cost as well as others where their deployment had not been previously considered. For example, TCAMs would enable routers to perform additional functions beyond address lookups, including, but not limited to, virus detection and intrusion detection.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations in the prior art for address look-up engines and more particularly to providing address look-up engines with low power, die area efficiency, and compatibility with high speed packet datarates In accordance with an embodiment of the invention there is provided a device comprising a clustered neural network processing algorithms storing ternary data.

In accordance with an embodiment of the invention there is provided a device comprising:
a first plurality of input clusters forming a first predetermined portion of a clustered neural network, each input cluster comprising of a first predetermined number of input neurons; and
a second plurality of output clusters forming a second predetermined portion of the clustered neural network, each output cluster comprising a second predetermined number of output neurons; wherein,
the clustered neural network stores a plurality of network addresses and routing rules relating to the network addresses as associations.

In accordance with an embodiment of the invention there is provided a method comprising:
providing an address lookup engine for a routing device employing a clustered neural network capable of processing ternary data;
teaching the address lookup engine about a plurality of addresses and their corresponding rules for routing data packets received by the routing device in dependence upon at least an address forming a predetermined portion of the data packet; and routing data packets using the address lookup engine.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 3A to 3C depict an IP lookup engine according to an embodiment of the invention exploiting wildcards in local storing, dummy neuron activation, and global storing processes;

FIGS. 4A to 4C depict a retrieving process for use within an IP lookup scheme with wildcards according to an embodiment of the invention;

FIGS. 5A to 5D depict a retrieving process for use within an IP lookup scheme with wildcards according to an embodiment of the invention;

FIGS. 14A and 14B depict circuits schematics for ambiguity elimination block and output selector forming portions of IP lookup engines according to the second implementation architecture in FIG. 10;

DETAILED DESCRIPTION

Figure 1:
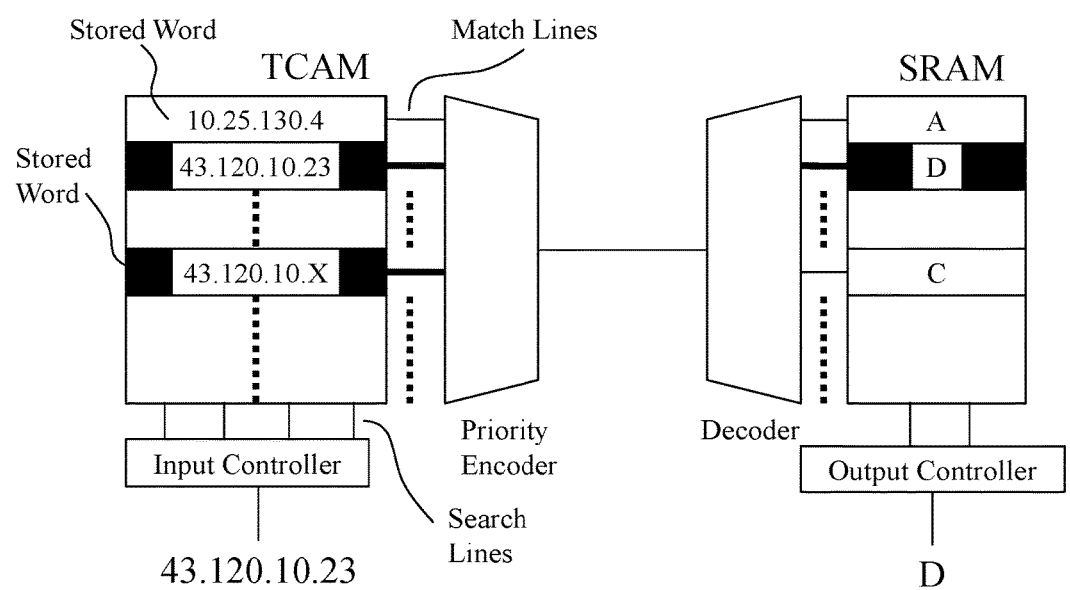
FIG. 1 depicts a prior art IP lookup engine exploiting TCAMs.

The present invention is directed to address look-up engines and more particularly to address look-up engines with low power, die area efficiency, and compatibility with high speed packet datarates.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

Within the specification a variety of subscripts in respect to mathematical descriptions of embodiments of the invention are employed. Where possible the standard format of $R_S$, where R is a variable and S is an integer, is employed. However, where $R_S$ is itself a subscript to another term then these are denoted as RS for clarity to avoid multiple levels of subscripts which are difficult to interpret in the published patent application.

1. Background

As noted supra embodiments of the invention for low-power large-scale IP lookup engines are implemented exploiting clustered neural networks (CNNs). A CNN is a neural network which stores data using only binary weighted connections between several clusters, see for example Gripon et al. in "Sparse neural networks with large learning diversity" (IEEE Trans. Neural Networks, Vol. 22, No. 7, pp. 1087-1096). Compared with a classical Hopfield Neural Network (HNN), see for example Hopfield in "Neural networks and physical systems with emergent collective computational abilities" (Proc. Nat. Academy of Sciences, Vol. 79, No. 8, pp. 2554-2558), the CNN requires less complex functions while learning (storing) larger number of messages. A hardware implementation for a CNN has been reported by Jarollahi et. al. in "Architecture and implementation of an associative memory using sparse clustered networks" (Proc. ISCAS 2012, pp. 2901-2904).

However, within an IP lookup engine there is the requirement for ternary not binary logic as LPM searching algorithms exploit three values, namely "0", "1", "don't care", which would make them incompatible with prior art CNNs. Accordingly, as described below in respect of embodiments of the invention, the inventors have extended the CNN concept to process ternary logic. Further, unlike TCAMs that store IP addresses themselves, hardware embodiments of the invention store the associations between IP addresses and output rules, increasing memory efficiency. The output rule may, in some embodiments of the invention, be determined through low complexity hardware using associations read from SRAMs, thereby reducing the search power dissipation compared with that of prior art TCAMs that require brute-force searches. As both IP addresses and their rules can be stored as associations in the proposed IP lookup engine, the additional SRAM that stores rules within a conventional TCAM-based IP lookup engine is not required.

2. Prior Art TCAM Based IP Lookup Scheme

FIG. 1 depicts an IP lookup scheme using a TCAM and a SRAM according to the prior art of Pagiamtzis et. al. in "Content-addressable memory (CAM) circuits and architectures: a tutorial and survey" (IEEE JSSC 2006, Vol. 41, No. 3, pp. 712-727). Ternary content-addressable memories (TCAMs) contain large number of entries from hundreds to several hundred thousand. Each entry contains binary address information and a wildcard (X) in TCAMs, while only binary information is stored in binary CAMs. The size of the entry is several dozen to hundreds, e.g. 128, 144 bits for IPv6, see for example Huang et al. in "A 65 nm 0.165 fJ/bit/search 256×144 TCAM macro design for IPv6 lookup tables" (IEEE JSSC 2011, Vol. 46, No. 2, pp. 507-519). In operation an input address is broadcast onto all entries through search lines and one or more entries are matched. A priority encoder finds the longest prefix match among these matched entries and determines a matched location that is an address of a SRAM containing rules. Since the matched location in the TCAM corresponds to an address of the SRAM, the corresponding rule is read.

As depicted in FIG. 1, an input address is 42.120.10.23 and this matches two entries, 42.120.10.23 and 42.120.10.X as X is a wildcard. Although two matched locations are activated, the matched location corresponding to 42.120.10.23 is selected. Finally, a "rule D" is read from the SRAM. TCAMs perform high-speed matching based on one clock cycle with a small number of entries. However there are some drawbacks when the number of entries is large, such as network routing. Since the search lines are connected to all entries, large search-line buffers are required, causing large power dissipation. The power dissipation of the search lines is the main portion of the overall power dissipation. In terms of die footprint, the number of transistors in a TCAM cell is 16, while it is 6 in a SRAM cell, resulting in an area inefficient hardware implementation.

Figure 2A:
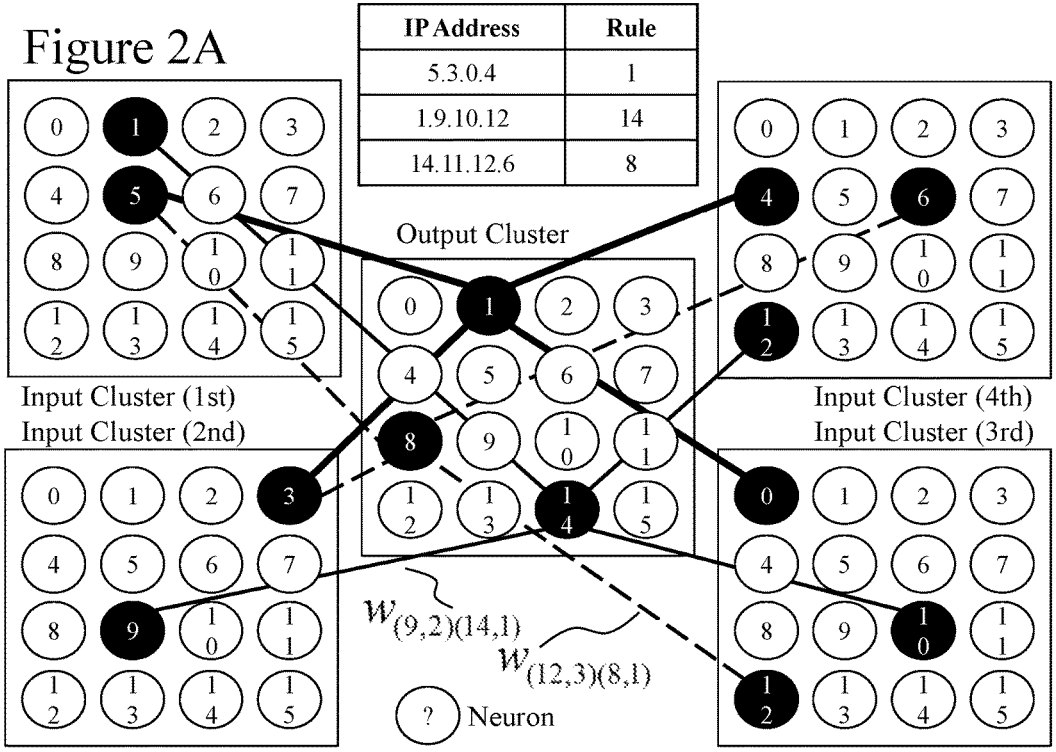
FIGS. 2A and 2B depict an IP lookup engine exploiting CNNs without wildcards in learning and retrieving processes.
Figure 2B:
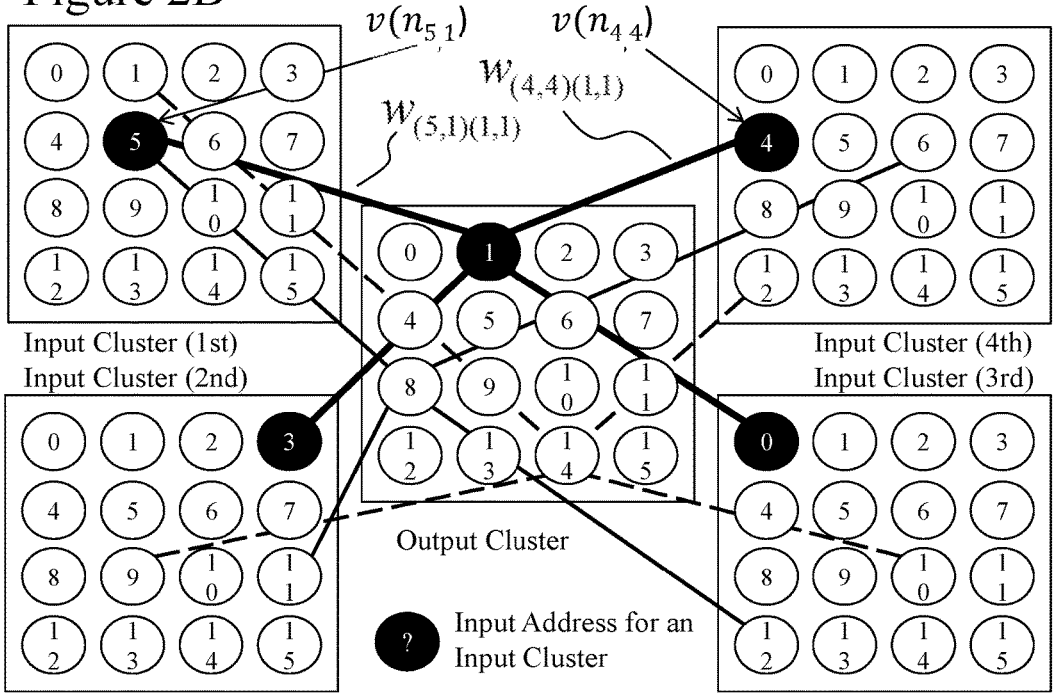

3. IP Lookup Based on Clustered Neural Network 3.1 IP Lookup Scheme without Wildcards As noted supra IP lookup engines according to embodiments of the invention are based upon extending the prior art binary CNN, see for example Gripon. Referring to FIG. 2A there is depicted an IP lookup scheme without wildcards (ILS) which provides the functions of a TCAM and a SRAM by storing associations between the IP addresses and their corresponding rules. There are c input clusters and c' output clusters. Each input cluster consists of l neurons and each output cluster consists of l' neurons. As depicted in the example within FIG. 2, c=4 and l=16 are set in the input cluster, while c'=1 and l'=16 are set in the output cluster. The input address has 16(c·log$_2$ l) bits and the output port has 4(c'·log$_2$l') bits.

3.1.1 Learning Process:

In the learning process (also referred to as a storing process), IP addresses and their corresponding rules (also referred to as ports) are stored. Suppose that a k-th (1≤k≤N) learning address $m_k$ is composed of c-sub-messages $m_{k1} \ldots m_{kc}$ and a k-th learning rule $m'_k$ is composed of c'-sub-messages $m'_{k1} \ldots m'_{kc'}$. N is the number of stored addresses. The length of the address is $c*\log_2 l$ bits and that of the rule is $c' \cdot \log_2 l'$ bits. The address is partitioned into c-sub-messages $m_{kj}$(1≤j≤c), whose size is κ=log$_2$ l bits. Each sub-message is converted into a l-bit one-hot signal, which activates the corresponding neuron in the input cluster, the l-bit one-hot signal having one of the l bits "1" and the others are "0". The rule is also partitioned into c'-sub-messages $m_{k'j'}$(1≤j'≤c'), whose size is κ=log$_2$ l' bits. Each sub-message is converted into a l'-bit one-hot signal, which activates the corresponding neuron in the output cluster. During the learning process of M messages $m_1 \ldots m_M$ that include input addresses and rules, the corresponding patterns (activated neurons) C(m) are learnt. Depending on these patterns, connections $w_{(i_1,j_1)(i_2,j_2)}$ between $i_1$-th neuron of $j_1$th input cluster and $i_2$-th neuron of $j_2$-th output cluster are stored according to Equation (1).

$$w_{(i_1,j_1)(i_2,j_2)} = \begin{cases} 1, & \text{if} \begin{cases} \exists m \in \{m_1 \ldots m_M\} \\ C(m)_{j1} = i_1 \\ C(m)_{j2} = i_2 \end{cases} \\ 0, & \text{otherwise} \end{cases} \quad (1)$$

where C(M) is a function that maps a message to a neuron.

This process is called "Global learning". Suppose that M messages are uniformly distributed. An expected density d defined as memory utilization for "Global learning" is given by Equation (2).

$$d' = 1 - \left(1 - \frac{1}{ll'}\right)^M \qquad (2)$$

For example, d'=0.3 means that stored bits of "1" are 30% of the whole bits in the memory. The density is related to a probability of ambiguity of output rules as described below.

3.1.2 Retrieving Process:

Within the retrieving process, an output neuron (rule) is retrieved using a c*k-bit input messages. The input message $m_{in}$ is partitioned into c-sub-messages $m_{inj}$(1≤j≤c), which are converted into l-bit one-hot signals. In each input cluster, one neuron that corresponds to the l-bit one-hot signal is activated. The value of each neuron $v(n_{i1,j1})(i_1<l,j_1\leq c)$ in the input cluster is given by Equation (3) below.

$$v(n_{i1,j1}) = \begin{cases} = 1, & \text{if} \quad m_{inf1} = i_1 \\ = 0, & \text{otherwise} \end{cases} \qquad (3)$$

This process is called "Local decoding". Then, values of neurons $v(n'_{i2,j2})$ in the output cluster, where $v(n_{i1,j1}(i_2<l', j_2\leq c')$ is the $j_2$-th neuron of the $i_2$-th input cluster, are updated using Equation (4).

$$v(n'_{i1,j1}) = \sum_{i1=0}^{l-1} \sum_{j1=1}^{c} w_{(i1,j1)(i2,j2)} v(n_{i1,j1}) \qquad (4)$$

In each output neuron, the maximum value $v_{Maxj_2}$ is found and then output neurons are activated using the Equations (5) and (6) respectively.

$$v_{Maxj2} = \max v(n'_{i2,j2}) \qquad (5)$$

$$v(n'_{i2,j2}) = \begin{cases} 1, & \text{if} \quad v(n'_{i2,j2}) = v_{maxj2} \\ 0, & \text{otherwise} \end{cases} \qquad (6)$$

The process described by processes covered by Equations (4) through (6) are called "Global decoding". In the example shown in FIG. 2B, the input message is 5.3.0.4. After applying Equation (4), the value of the l-th neuron in the output cluster is 4 and becomes the maximum value. Hence, the rule "1" is retrieved.

For learnt messages, there may be ambiguity in that more than two neurons (rules) are retrieved in the output cluster after "Global decoding". The probability of ambiguity $P_{amb}$ is given by Equation (7).

$$P_{amb} = 1 - (1 - d^c)^{e'(l'-1)} \qquad (7)$$

$P_{amb}$ is calculated based on learnt messages that are uniformly distributed. If the learnt messages are correlated, then the inventors through simulations described below have established that these correlated patterns do not affect $P_{amb}$ significantly.

If the number of stored addresses (M) is increased, an input address might activate an output neuron that does not correspond to the input address because of the multiplicity of stored connections.

3.2 IP Lookup Scheme with Wildcards 3.2.1 Learning

Figure 3A:
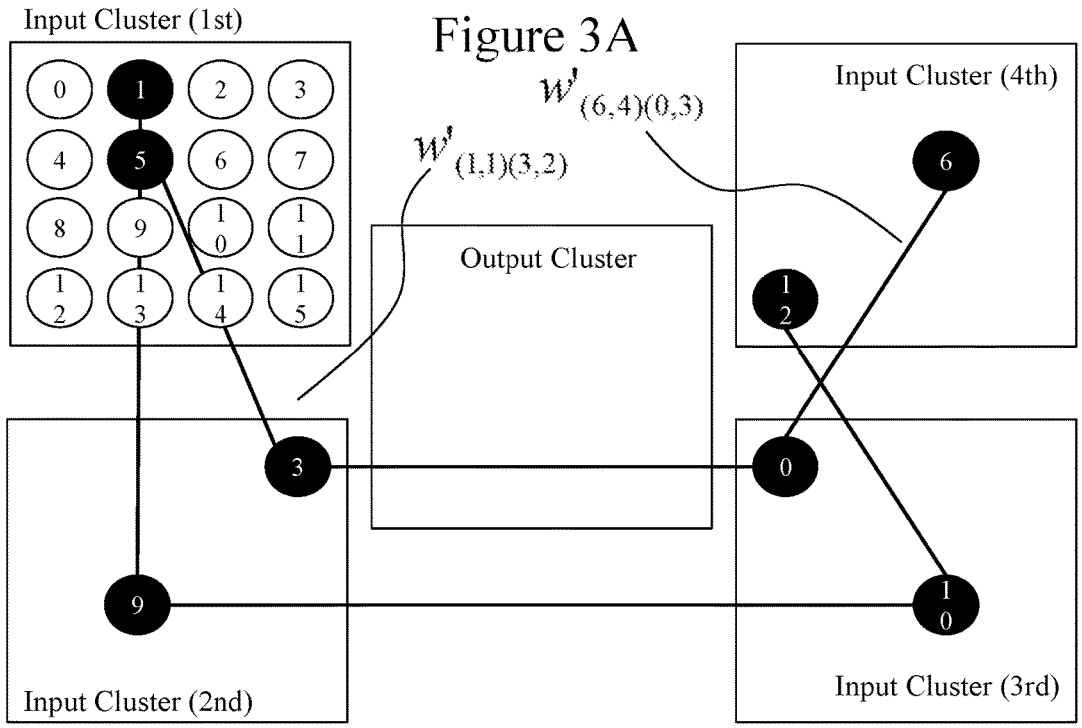
Figure 3B:
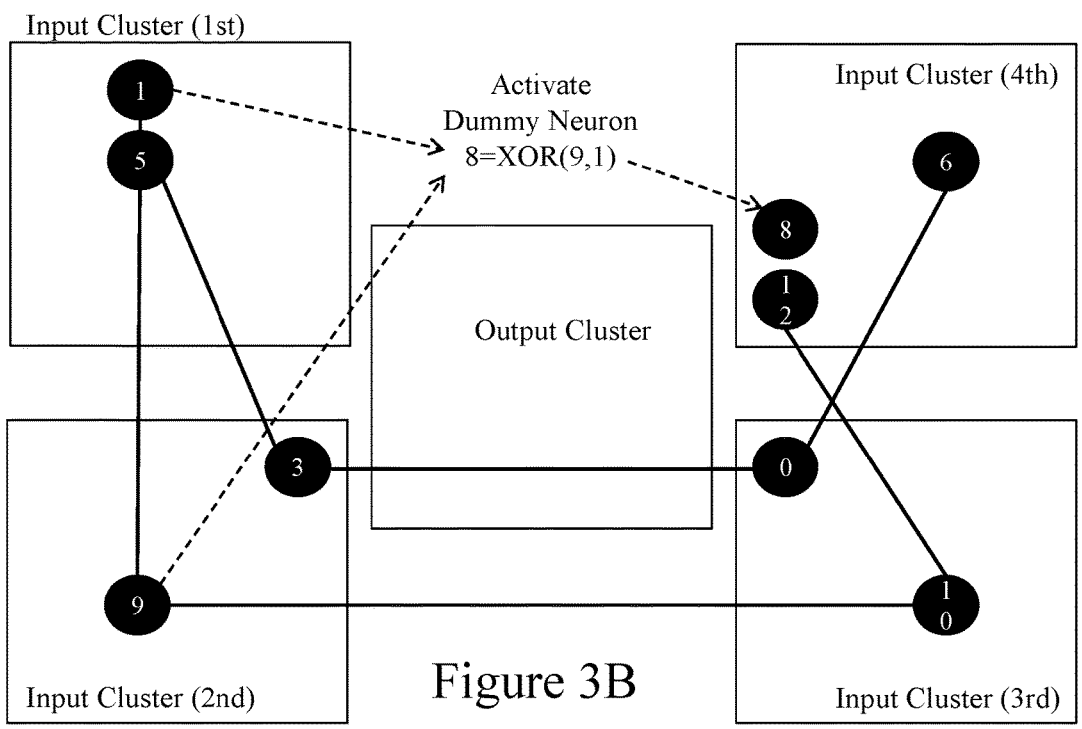

As an IP routing table contains wildcards (X), the IP lookup scheme is extended to store wildcards in the table. Referring to FIGS. 3A to 3C there is depicted a learning process according to an embodiment of the invention for an IP lookup scheme with wildcards (ILSW). There are two different connections: $w'_{(i,j)(i',j')}$ and $w_{(i1,j1)(i2,j2)}$. $w'_{(i,j)(i',j')}$ which represent connections between activated neurons in the input clusters, while $w_{(i1,j1)(i2,j2)}$ represents connections between activated neurons in the input and output clusters. In the learning process for $w'_{(i1,j1)(i2,j2)}(0 \leq i_1(i_2) < l: 1 \leq j_1(j_2) \leq c)$ depicted in FIG. 3A, an address learnt is partitioned into c-sub-messages with size $\kappa = \log_2 l$ bits. If the sub-message is binary information, it is converted into an l-bit one-hot signal, which activates the corresponding neuron in the input cluster. If it is a wildcard, no neuron is activated in the input cluster. The output neurons are activated to store connections using the same, or comparable, algorithm to that employed within the IP lookup scheme without wildcards as depicted in FIG. 2. During the learning of M messages $M_1', \ldots, M_M'$ that include only input connections and depending on the corresponding patterns (activated neurons) C(m), connections $w_{(i,j)(i',j')}$ between i-th neuron of j-th input cluster and i'-th neuron of j'-th input cluster are stored based upon Equation (8).

$$w_{(i_1,j_1)(i_2,j_2)} = \begin{cases} 1, & \text{if} \begin{cases} \exists m \in \{m_1 \ldots m_M\} \\ j+1 = j' \\ C(m)_j = i \\ C(m)_{j'} = i' \end{cases} \\ 0, & \text{otherwise} \end{cases} \qquad (8)$$

This process is called "Local learning".

FIG. 3B shows a process of a wildcard replacement for connections between the input and the output clusters $w_{(i_1,j_1)(i_2,j_2)}$ ($0 \leq i_1 \leq l:0 \; i_2 < l':1 \leq j_1 \leq c:1 \leq j_2 \leq c'$) wherein dummy neurons are activated when learnt messages include wildcards. Suppose that the last half of learnt messages have wildcards distributed randomly. If a sub-message is a wildcard, the wildcard is replaced by dummy information that is binary one. The dummy information is determined by a function using the first half of the learnt messages. According to an embodiment of the invention, the function is realized by XORing two sub-messages of the first half of learnt messages. The k-th learning sub-messages $m_{kj}$ that contain wildcards (X) are replaced as $md_{kj}$ according to Equation (9).

$$md_{kj} = \begin{cases} m_{k(j-\frac{c}{2})} \oplus m_{k(j-\frac{c}{2}+1)(mod\frac{c}{2})} A, & \text{if} \begin{cases} m_{kj} = X \\ \text{and}(j > c_b) \end{cases} \\ m_{kj}, & \text{otherwise} \end{cases} \qquad (9)$$

Alternatively, this may be thought of that if a sub-address is a wildcard the wildcard is replaced by a dummy sub-address generated $md_{kj}$(1≤j≤c), where 1≤k≤N. Accordingly, if we suppose that the first $c_b$ sub-addresses are known and the last (c−$c_b$) sub-addresses are either known or are wildcards. The dummy sub-address is generated using a function that employs the first $c_b$ sub-addresses.

In the example shown in FIG. 3B, the learnt message 1.9.10.X has a wildcard. The wildcard is replaced by XORing 9⊕1 that are the two sub-messages in the first two input clusters, hence the wildcard becomes 8. After making dummy neurons, process (1) is performed by using $md_k$ instead of $m_k$ in order to make connections between the input and output clusters and then these connections are stored. For example, the dummy sub-message (sub-address) is converted to an l-bit one-hot signal that activates the corresponding dummy neuron in an input cluster associated with the wildcard. Accordingly, the M stored messages are now defined by $M_1, \ldots, M_M$ which include the updated input addresses and output rule (port) and connections between the input and the output activated neurons are stored as shown in FIG. 3C and are given by Equation (10).

$$w_{(i1,j1)(i2,j2)} = \begin{cases} 1, & \text{if} \begin{cases} \exists M \in \{M_1, \ldots, M_M\} \\ \text{and} C(M)_{j1} = i_1 \\ \text{and} C(M)_{j2} = i_2 \end{cases} \\ 0, & \text{otherwise} \end{cases} \quad (10)$$

3.2.2 Retrieving

In the retrieving process, the proposed IP lookup scheme with wildcards (ILSW) checks whether input messages $m_{inj}(1 \le j \le C)$ are stored or not using stored connections. If an activated neuron corresponding to an input sub-message $m_{inj1}$ in the $j_1$-th input cluster doesn't have a connection to an activated neuron in the precedent input cluster, $m_{inj1}$ can be decided as "non-stored messages". Hence, the activated neuron is de-activated and alternatively a dummy neuron is activated according to the rules in Equations (10) and (11). This process initially partitions an input message $m_{in}$ into c sub-messages which are themselves converted into l-bit one hot signals and hence where an activate neuron corresponding to an input sub-address $m_{inj1}$ in the $j_1$-th input cluster has no connection to an activated neuron in the $(j_1-1)$-th input then the cluster $m_{inj1}$ may be treated as a non-stored message and is not used but rather a dummy sub-message is generated according to Equations (10) and (11) respectively. First, the number of connections $con_{j1}$ in the $j_1$-th input cluster is given by Equation (11).

$$con_{j_1} = \sum_{j=1}^{j_1} w_{(m_{in(j-1),j-1})(m_{inj,j})} \quad (11)$$

If $con_{j_1}$ is less than $(j_1-1)$, the input sub-messages are not stored. Then, the input sub-messages $m_{inj1}$ are replaced as $m_{inj1}$, by dummy information as determined by Equation (12).

$$ms_{inj1} = \begin{cases} m_{in(j_1-\frac{c}{2})} \\ \oplus m_{in(j_1-\frac{c}{2}+1)}, & \text{if} \begin{cases} con_{j_1} < j_1 - 1 \\ \text{and}(j_1 > c_b) \end{cases} \\ m_{inj1}, & \text{otherwise} \end{cases} \quad (12)$$

These rules in Equations (11) and (12) define processes are referred to as "Input selection" or "Input replacement". Then, $v(n_{i1,j1})$ is obtained based on using Equation (3) by using $ms_{inj1}$ instead of $m_{inj}$. In the example shown initially in FIG. 4A an input message 5.3.10.6 is added with an output rule 5. Subsequently as depicted in FIG. 4B an input message 1.9.10.6 is input. Since the activated neuron "6" in the 4th input cluster doesn't have a connection to the activated neuron "10" in the 3rd input cluster, the activated neuron is de-activated. Instead, a dummy neuron "4" in the 4th input cluster is activated.

The subsequent process is "Global decoding" based upon exploiting the processes defined in Equations (4) through (6) respectively. As the first-half input clusters have only binary information, the summation of $w_{(i1,j1)(i2,j2)}v(n_{i1,j1})$ from the first-half ones must be the half of the number of input clusters, if output neurons are a candidate rule. In the IP lookup scheme with wildcards (ILSW), Equation (4) is re-defined by Equation (13).

$$ena_{i2,j2} = \sum_{i1=0}^{l-1} \sum_{j1=1}^{c_b} w_{(i1,j1)(i2,j2)}v_{(ni1,j1)} \quad (13)$$

Accordingly, $ena_{i2,j2}$ must be equal to $c_b$ if an input address is stored by $v(n_{i1,j1})$ being equal to 1. If $ena_{i2,j2}$ is less than $c_b$, the corresponding output neuron is not related to the input address. Hence the summation in Equation (4) is redefined by Equations (14) and (15).

$$sum_{i2,j2} = \sum_{i1=0}^{l-1} \sum_{j1=\frac{c}{2}+1}^{c} w_{(i1,j1)(i2,j2)}v_{(ni1,j1)} \quad (14)$$

$$v(n'_{i2,j2}) = \begin{cases} sum_{i2,j2}, & \text{if\_ena}_{i2,j2} = \frac{c}{2} \\ 0, & \text{otherwise} \end{cases} \quad (15)$$

After these processes are executed the processes established by Equations (5) and (6) are executed. Referring to Table 1 the learnt messages as a result of the "Local decoding" and "Global decoding" processes described supra in respect of FIGS. 3 and 4 are presented showing the IP address, IP address with dummy and the associated rule.

TABLE 1

| Learnt Messages from Process Depicted in FIGS. 3 and 4 | | |
| --- | --- | --- |
| IP Address | IP Address with Dummy | Rule |
| 5.3.0.6 | 5.3.0.6 | 1 |
| 1.9.10.12 | 1.9.10.12 | 14 |
| 1.9.10.X | 1.9.10.8 | 8 |

3.3 Global Decoding with Max Functions
3.3.1 Learning

The proposed ILSW described supra in Section 3.2 requires a max function in the Global decoding, which results in large hardware overheads in terms of speed. The reason for a max function being required is that the maximum value of $v(n'_{i2,j2})$ is varied depending on input messages, where $v(n'_{i2,j2})$ can be up to $(c-c_b)$. In the Input replacement, an input sub-message that is not stored might be wrongly treated as a "stored sub-address", especially when many addresses are stored. In this case, the input sub-address activates the wrong neuron, which is not later replaced by the dummy neuron. Once the wrong neuron is activated in the input cluster, there may not exist a connection to an output candidate. As a result, the maximum value of $v(n'_{i2,j2})$ would be less than $(c-c_b)$ that needs to be detected using the max function.

To eliminate the max function, the maximum value has to be stable. Referring to FIGS. 5A to 5D there is depicted a retrieving process according to an embodiment of the invention exploiting a modified proposed IP lookup scheme with wildcards (MILSW). In the retrieving process, $m_{in}$ which contains dummy sub-addresses is generated using Equations (10) and (11). In addition, additional dummy sub-addresses $ma_{in}(1 \leq j_1 \leq c)$ are generated using the processed defined by Equation (16).

$$ma_{inj1} = \begin{cases} m_{in(j1-c_b)} \oplus m_{in(j-c_b+1)(mod c_b)}A, & \text{if}(j_1 > c_b) \\ m_{inj1}, & \text{otherwise} \end{cases} \quad (16)$$

In Equation (16) all dummy sub-addresses related to an input address are generated. Using $m_{in}$ and $ma_{in}$, input neurons and all dummy neurons in the input clusters are activated based on (3) instead of using $m_{in}$. In this case, all the stored connections for Global storing relating to the input address are retrieved. Hence the maximum value of $v(n'_{i2,j2})$ is $(c-c_b)$ in Equation (15). The summation and max function are replaced by an AND-OR function when the maximum value is fixed, see for example the inventors in Ozinawa et al "Clockless Stochastic Decoding of Low-Density Parity-Check Codes: Architecture and Simulation Model" (J. Signal Processing Systems, pp. 2523-2526, 2013, hereinafter Ozinawa1). As a result the output neuron $v(n'_{i2,j2})$ is given by Equation (17).

$$v(n'_{i2,j2}) = \bigwedge_{j1=1}^{c} \bigvee_{i1=0}^{l} \omega_{(i1,j1)(i2,j2)} v(n_{i1,j1}) \quad (17)$$

In the example shown in FIGS. 5A to 5D one additional entry is stored in Table 1 with an input address is 5.3.10.6 and its output port is 5, where $c_b$, is equal to 3. In FIGS. 5A to 5D the solid lines indicate connections for Local storing and the dashed lines indicate connections for Global storing. When an input address is 1.9.10.6, a neuron "6" in the 4th input cluster is wrongly activated because a connection between the neuron "6" in the 4th input cluster and a neuron "10" in the 3rd input cluster exists as shown in FIG. 5B. Regardless of the activated neuron "6", a dummy neuron "S" is activated following (16) using two sub-addresses in the first two clusters shown in FIG. 5C. Using all activated input neurons including the wrongly activated and the dummy neurons, the output neuron is activated as shown in FIG. 5D. In this case, the maximum value of $v(n'_{i2,j2})$ is 4 that is the number of input clusters (c). In contrast, when (12) is used, the maximum value is 3 that cannot be detected using the AND-OR function because the dummy neuron "8" in the 4th cluster is not activated.

3.3.2 Probability of Generating Ambiguous Outputs

The MILSW also has a probability of generating ambiguous outputs at each entry similar to that of the ILS in (7). For the probability, an expected density for local storing is described. In local storing, the density is different depending on positions of stored sub-messages because the message lengths excluding wildcards range from $(c-c_b)\log_2 l$ to $\log_2 l$ bits. Now suppose the number of sub-messages excluding wildcards are uniformly distributed then the density from the j-th input cluster to the (j+1)-th cluster for Local storing is given by the Equation (18).

$$d_j = 1 - \left(1 - \frac{1}{l^2}\right)^{N(c-j)/(c-c_b+1)} \quad (18)$$

In the MILSW, there are two types of "wrongly" activated neurons in the input clusters from $(c-c_b)$ to c. These two types of the activated neurons affect the probability. In the first type related to (12), when a sub-message that is not stored is wrongly treated as a "stored sub-message", the corresponding neuron is wrongly activated. The average number of wrongly activated neurons per input cluster in the first type ($w_1$) is given by Equation (19).

$$\omega_1 \cong \frac{1}{c-c_b+1} \sum_{j=c_b}^{c-1} \sum_{k=1}^{c-j} \left( k \prod_{r=j}^{j+k+1} d_r(1-d_k+1) \right) \quad (19)$$

In the second type related to (16), a dummy neuron is activated even if a correct neuron that is actually stored is activated in the same input cluster. In this case, the dummy neuron is "wrongly" activated. The average number of wrongly activated neurons per input cluster in the second type ($\omega_2$) is given by Equation (20).

$$\omega_2 \cong \frac{1}{c-c_b+1} \sum_{j=1}^{c-c_b} j \quad (20)$$

Hence, the average number of activated neurons per input cluster from $c_b$ to $c(\omega_a)$ as given by Equation (21). As the activated neurons including "wrongly" activated neurons affect the probability ($p_t$) in MILWS, where $p_t$ is obtained by modifying (7) to yield Equation (22) where $c_i$ is the number of independent activated neurons in the input clusters, which is affected by the function used in (9), (12) and (16).

3.4 Ambiguity Analysis

The probability of generating ambiguous outputs at each entry ($P_{amb}$) is evaluated using a condition of l=512, c=16, l'=1024, and c'=1. Suppose two different $c_b$ are used as 4 and 8. The functions of generating dummy sub-addresses in (16) are designed using XOR functions and are summarized as an example in Table 2. The functions are the same in (9), (12) and (16). As the dummy sub-addresses are generated using the first $c_b$ sub-addresses, some functions can be the same in $c_b$=4. Supposing the number of stored sub-addresses excluding wildcards are uniformly distributed then $c_i$ is about 14.3 in the case of $c_b$=4.

TABLE 2

Example of Dummy Sub-Message Generation in (16)

| | f in $c_b$ = 8 | f in $c_b$ = 4 |
|---|---|---|
| $ma_{in0}$ | $m_{in0}$ | $m_{in0}$ |
| $ma_{in1}$ | $m_{in1}$ | $m_{in1}$ |
| $ma_{in2}$ | $m_{in2}$ | $m_{in2}$ |
| $ma_{in3}$ | $m_{in3}$ | $m_{in3}$ |
| $ma_{in4}$ | $m_{in4}$ | $m_{in0} \oplus m_{in1} \oplus m_{in2} \oplus m_{in3}$ |
| $ma_{in5}$ | $m_{in5}$ | $m_{in1} \oplus m_{in2} \oplus m_{in3} \oplus m_{in0}$ |
| $ma_{in6}$ | $m_{in6}$ | $m_{in2} \oplus m_{in3} \oplus m_{in0} \oplus m_{in1}$ |
| $ma_{in7}$ | $m_{in7}$ | $m_{in3} \oplus m_{in0} \oplus m_{in1} \oplus m_{in2}$ |
| $ma_{in8}$ | $m_{in0} \oplus m_{in1}$ | $m_{in0} \oplus m_{in1} \oplus m_{in2}$ |
| $ma_{in9}$ | $m_{in1} \oplus m_{in2}$ | $m_{in1} \oplus m_{in2} \oplus m_{in3}$ |
| $ma_{in10}$ | $m_{in2} \oplus m_{in3}$ | $m_{in2} \oplus m_{in3} \oplus m_{in0}$ |
| $ma_{in11}$ | $m_{in3} \oplus m_{in4}$ | $m_{in3} \oplus m_{in0} \oplus m_{in1}$ |
| $ma_{in12}$ | $m_{in4} \oplus m_{in5}$ | $m_{in0} \oplus m_{in1}$ |
| $ma_{in13}$ | $m_{in5} \oplus m_{in6}$ | $m_{in1} \oplus m_{in2}$ |
| $ma_{in14}$ | $m_{in6} \oplus m_{in7}$ | $m_{in2} \oplus m_{in3}$ |
| $ma_{in15}$ | $m_{in7} \oplus m_{in8}$ | $m_{in3} \oplus m_{in0}$ |

Figure 6:
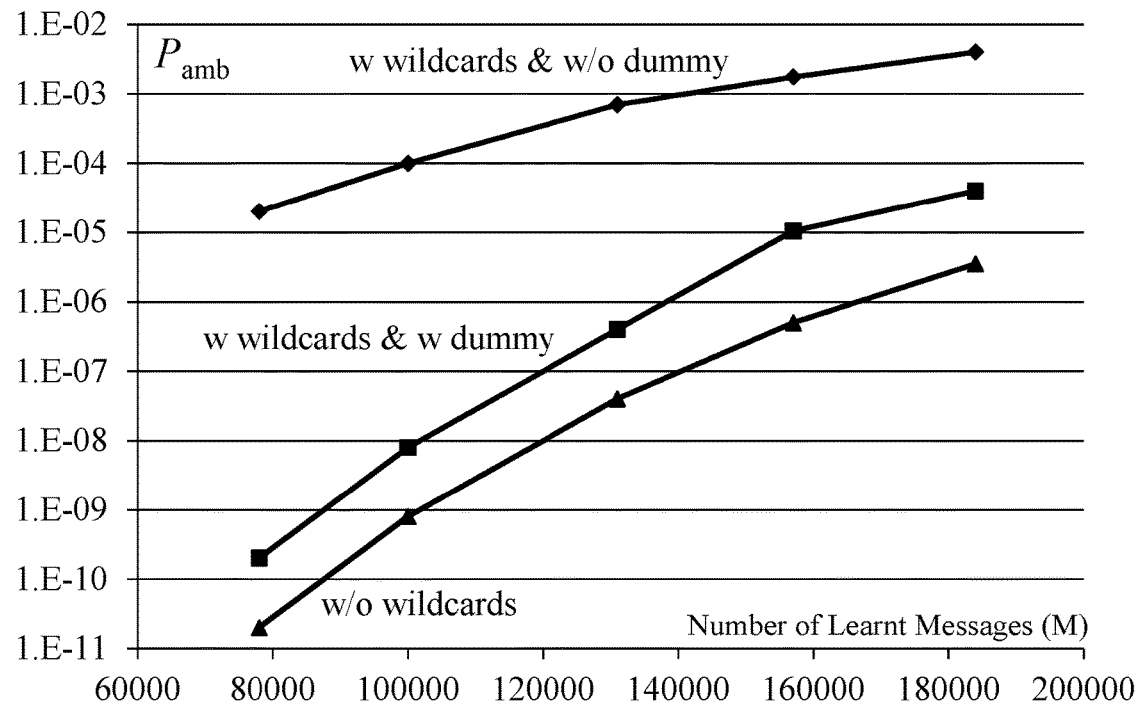
FIG. 6 depicts ambiguity probability versus number of learnt messages for an IP engine according to an embodiment of the invention.

FIG. 6 shows the probability of ambiguity $P_{amb}$ versus the number of learnt messages (M) in the IP lookup schemes (l=512,c=16,l'=1024,c'=1). $P_{amb}$ is the probability that more than two neurons are activated for learnt messages. In this condition, the proposed IP lookup schemes store 144-bit (c*$\log_2$ l) addresses (messages) for IPv6 headers. The maximum length is 36 bits for $c_b$=4 and 72 bits for $c_b$=8. Further when the stored length is 36 bits, the wildcard length is 108 bits.

$P_{amb}$ without wildcards is defined by Equation (7). $P_{amb}$ with wildcards was evaluated by simulations. Unlike IPv4, since packet traces for the long prefix table are not available to the public and the prefix table is still small, see for example "Border Gateway Protocol (BGP)" (http://bgp.potaroo.net), addresses were chosen randomly for the evaluation. The stored addresses are uniformly distributed. Random-length wildcards appear in the last half of addresses (72 bits). If the range of addresses that have wildcards is changed, the prefix length can be changed.

It is evident from FIG. 6 that $P_{amb}$ is strongly dependent of M. Within the IP lookup scheme according to embodiments of the invention with wildcards, if a dummy neuron is the same neuron as that already stored, then both outputs (rules) might be retrieved, which slightly increases $P_{amb}$ compared with that of the IP lookup scheme without wildcards. Adding dummy neurons however as can be seen is very effective at lowering $P_{amb}$. This reduction is about five orders of magnitude reduction of that without dummy neurons at M=78,643. As evident in FIG. 5 the IP lookup scheme according to an embodiment of the invention with wildcards can store 100,000 144-bit IP addresses with a negligibly low probability of $P_{amb}$ (<$10^{-8}$).

$P_{amb}$ was also simulated when the learnt messages are correlated. The word length in the IP lookup scheme with wildcards is 64 bits (l=256, c=8, l'=1024, c'=1). The first 8 bits of the learnt messages are selected from 64 fixed patterns of 256 ($2^8$). The rest of the learnt messages are uniformly distributed. Random-length wildcards appear in the last half of addresses (32 bits). At M=10,000, $P_{amb}$ using the correlated patterns was 5.30×$10^{-7}$ while $P_{amb}$ using uniformly distributed patterns is 1.69×$10^{-7}$.

Unlearnt input messages are detected as "mismatch" via a two-step process. In the first step, the number of local connections $con_{c/2}$ in Equation (10) is checked in "Input selection". If it is not the same as ((c/2)−1), an unlearnt input message can be detected as "mismatch" because all local connections related to the input message are not stored ("Mismatch 1"). If an unlearnt input message is detected as "match" by other stored connections, the number of global connections $ena_{i2,j2}$ is checked at "Global decoding". If all $ena_{i2,j2}$ are not the same as (c/2), an unlearnt input message can be detected as "mismatch" because all global connections between the input message and all output rules are not stored ("Mismatch 2").

4. Hardware Implementation 4.1 Implementation 1

Figure 7:
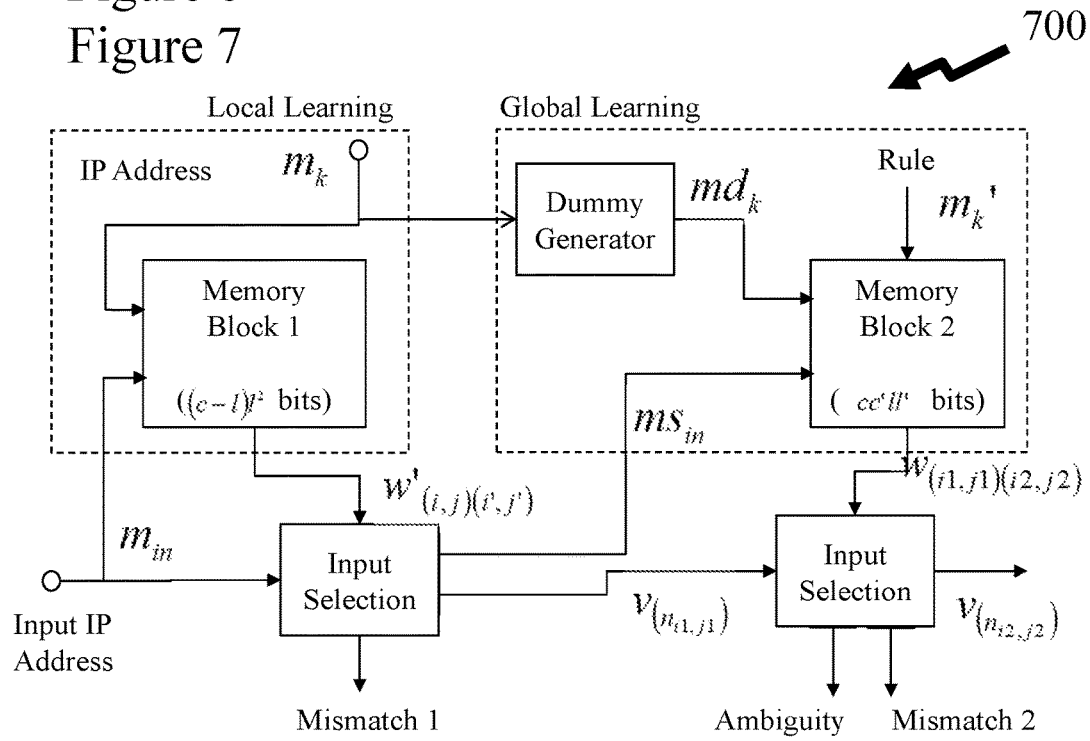
FIG. 7 depicts a first implementation architecture for an IP lookup engine according to an embodiment of the invention.

Referring to FIG. 7 there is depicted an overall structure 700 of an IP lookup engine according to an embodiment of the invention with wildcards. The learning process is "Local learning" using Equation (8) and "Global learning" as presented in respect of Equations (9) and (1). The retrieving process employed exploits the following process:

1) each input-sub message is replaced by a dummy message if it is not stored ("Input selection") according to Equations (10) and (11);
2) connections between c activated neurons in the input clusters are read from a memory block 1 ("Local decoding") established in dependence of Equation (3); and
3) an output neuron is retrieved based on connections between neurons of the input and the output clusters in a memory block 2 in using processes established by Equations (12) to (14), (5), and (6) respectively ("Global decoding").

Figure 8:
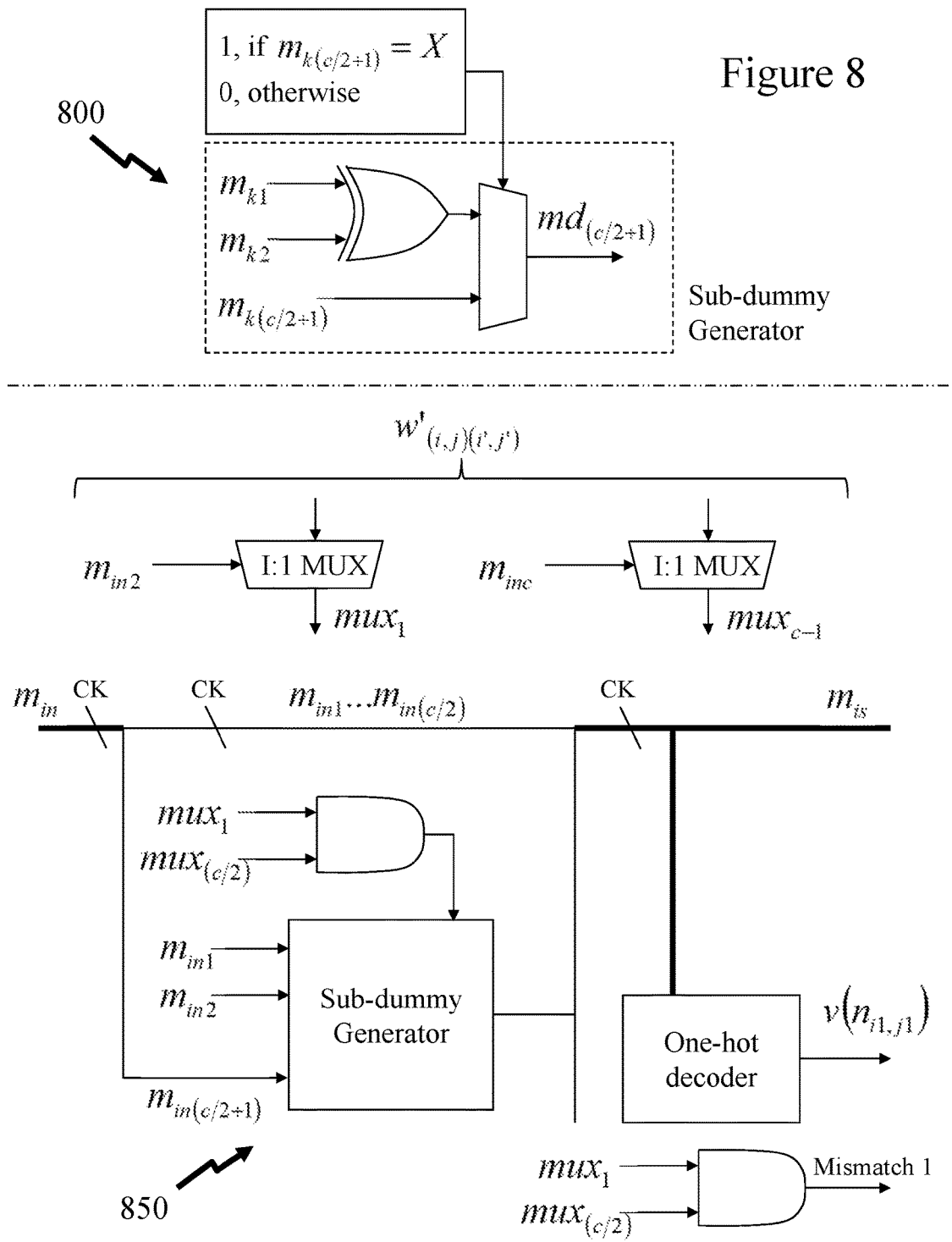
FIG. 8 depicts circuit schematics for a dummy generator and input selection block forming portions of an IP lookup engine according to the first implementation architecture in FIG. 7.

There are ((c−1)$l^2$)-bit SRAMs for "Local learning" and c'll'-bit SRAMs for "Global learning". In "Local learning", a sub-input k-th learning address $m_1$ and the subsequent one $m_{kj}$, are converted into one-hot l-bit signals at row and column decoders, respectively. Then, a ($w_{(i,j)(i',j')}$) is stored in the memory block 1 if both are not a wildcard. In "Global learning", the last half of an input address is replaced by dummy information using a dummy generator that includes (c/2) sub-dummy generators if each sub-input address is a wildcard. The architecture of a sub-dummy generator being depicted by first circuit 800 in FIG. 8. The sub-dummy generator contains l 2-input XOR gates and multiplexors. Using the sub-input address with dummy information $md_{kj1}$ and the corresponding rule $m'd_{kj2}$, a ($w_{(i1,j1)(i2,j2)}$) is stored in the memory block 2.

Figure 9:
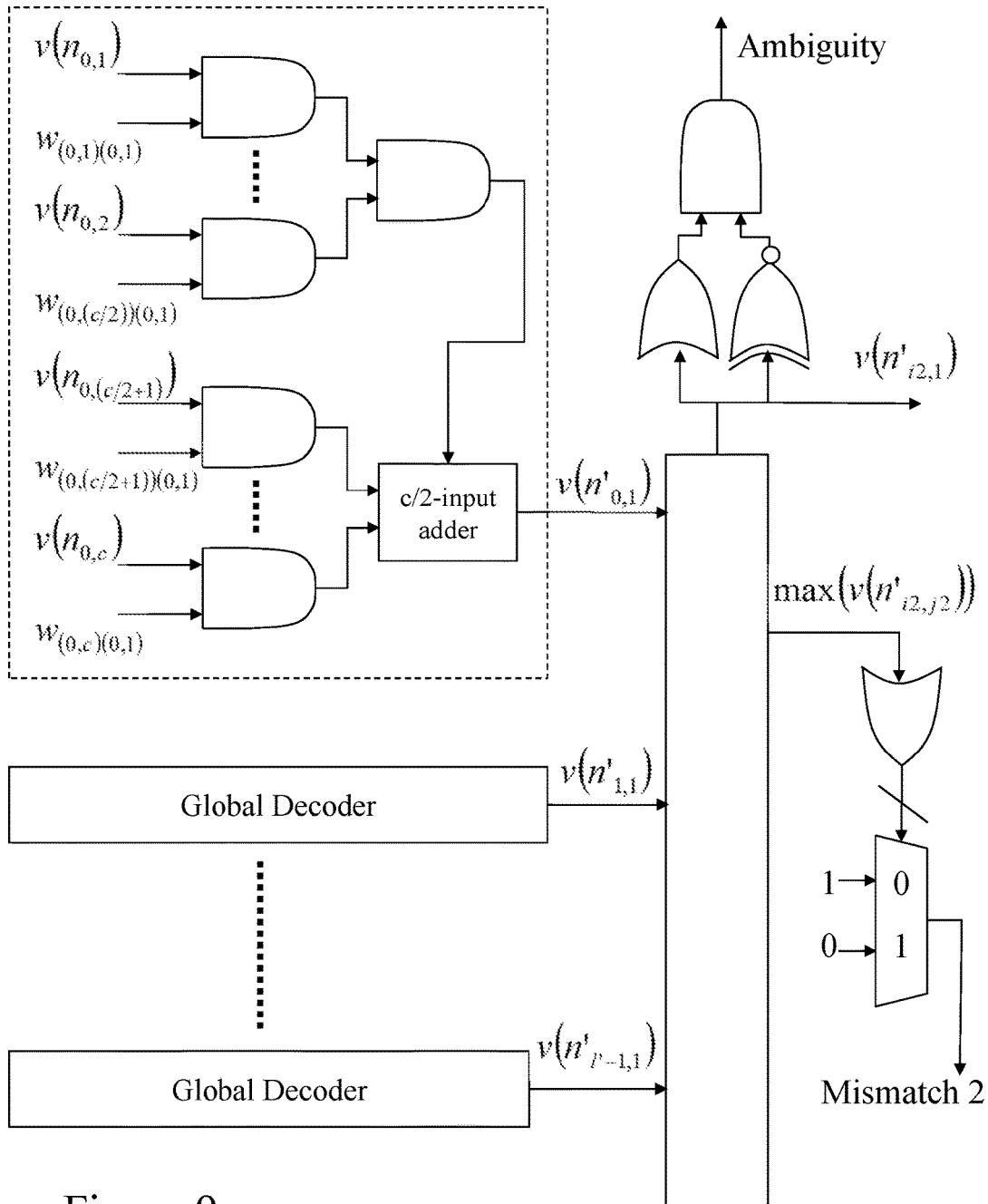
FIG. 9 depicts a circuit schematic for a decoding module forming part of an IP lookup engine according to the first implementation architecture in FIG. 7.

In the retrieving process, an input address $m_{in}$ is partitioned into c-sub-messages and ((c−1)l) connections ($w_{(i,j)(i',j')}$) are read from the memory block 1. $w_{(m.inj,j)(m.in(j+1),j+1)}$ in Equation (10) are selected in a multiplexor of an input-selection module. The input-selection module being depicted by second circuit 850 in FIG. 8. Then, the last half of the input address is replaced by dummy information if these corresponding connections are not found. The output $ms_{in}$ that contains the first half of the input address and the generated last half of input address is sent to the memory block 2. The one-hot decoder transforms $m_{in}$ to $v(n_{i1,j1})$. In the memory block 2, (c'l') connections ($w_{(i1,j1)(i2,j2)}$)) are read by $ms_{in}$ and are sent to a decoding module shown in FIG. 9. The decoding module contains (c'l') global decoder, c' max-function blocks and c' ambiguity checkers, where c' is set to 1 in FIG. 9. In the global decoder, (c/2) 2-input AND gates and (c/2)-input AND gate generate an enable signal to a (c/2)-input adder, where these circuits are corresponding to (12)-(14). There are a l'-input max-function block that decides an activated neuron $v(n_{i2,j2})$=1. The ambiguity checker checks that two neurons are activated simultaneously.

4.2 Implementation 2

Figure 10:
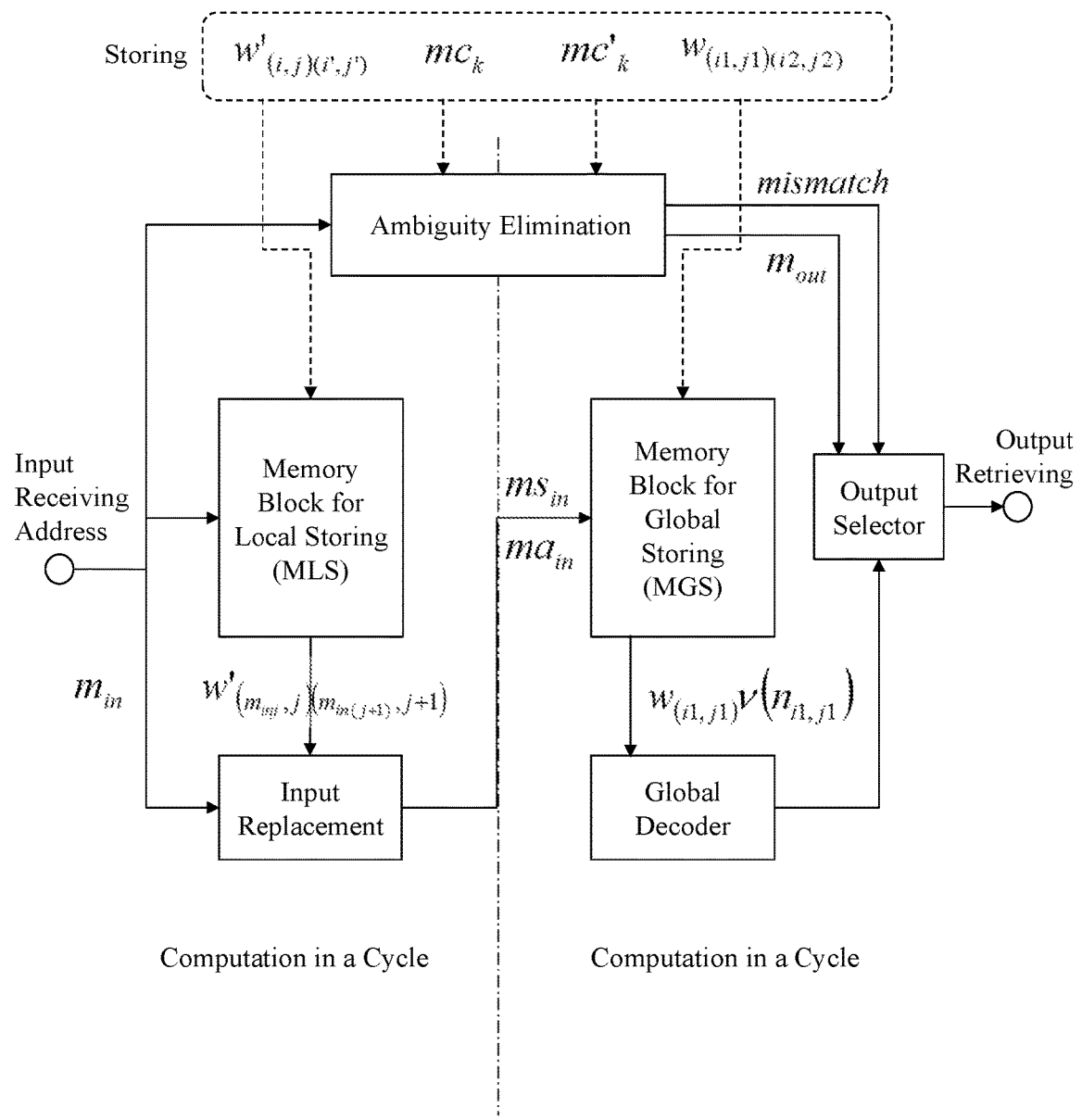
FIG. 10 depicts a second implementation architecture for an IP lookup engine according to an embodiment of the invention.

Referring to FIG. 10 there is depicted an overall structure of another implementation of an IP lookup engine. A memory block for local storing (MLS) stores connections in (8) and one for global storing (MGS) stores connections in (1O). These memory modules are designed using SRAMs. A local decoding module in (3) is a one-hot decoder included in the memory blocks. An ambiguity elimination block includes a small TCAM that stores the ambiguous entries in the ILSW (MILSW), wherein it should be noted that the ambiguous entry generates more than one output port. If the ILSW (MILSW) retrieves multiple output ports, the ambiguous entry is matched to an input search address. In this case, the output of the IP lookup engine is selected from the ambiguity elimination block in an output selector. Otherwise, it is selected from the ILSW (MILSW). The ILSW takes 2 clock cycles and the MILSW takes 3 clock cycles for the retrieving process. The ambiguity elimination block takes 2 clock cycles.

Figure 11A:
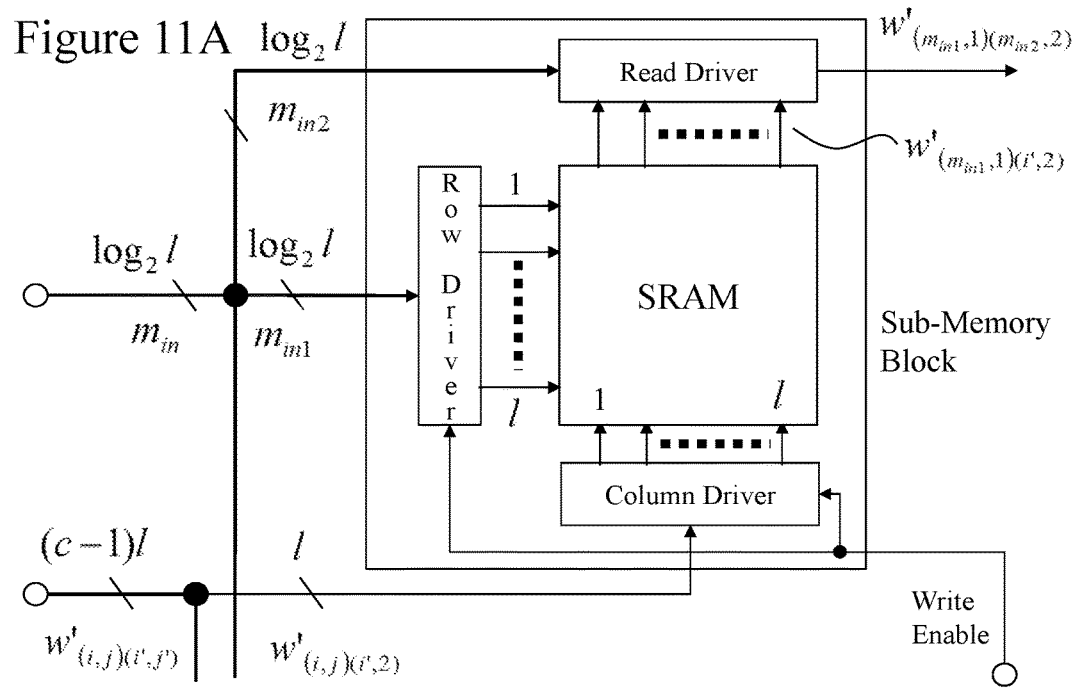
FIGS. 11A and 11B depict circuits schematics for memory blocks providing local storing (MLS) and global storing (MGS) forming portions of an IP lookup engine according to the second implementation architecture in FIG. 10.
Figure 11B:
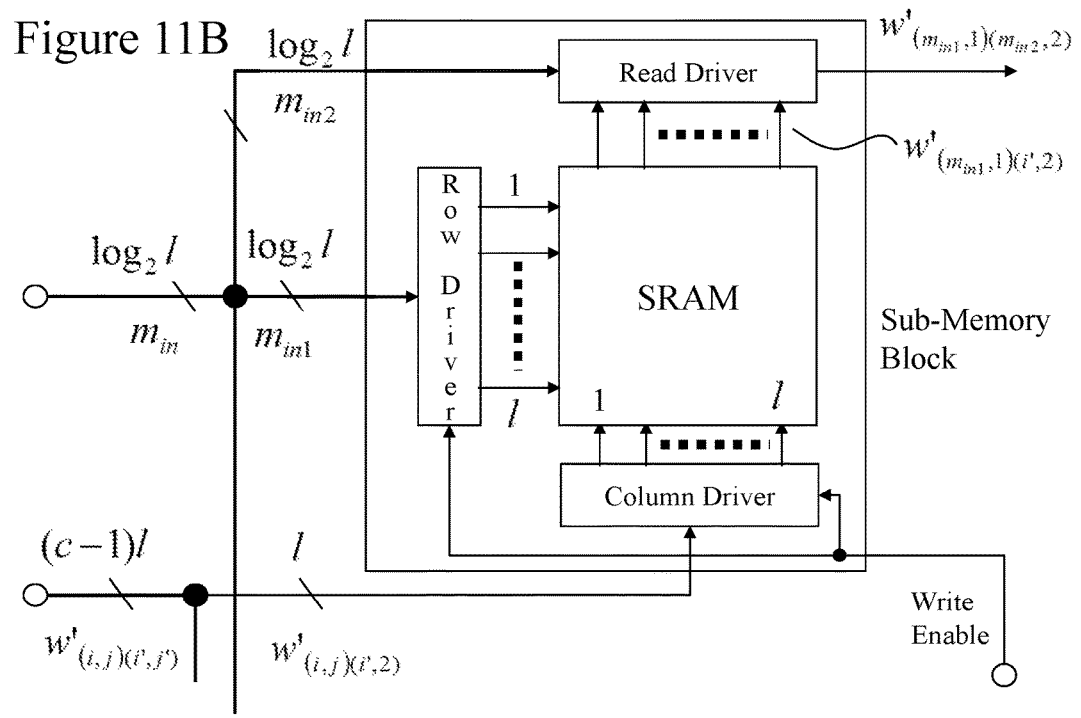

FIG. 11 shows the MLS contains (c−1) $l^2$-bit sub-memory blocks and the MGS contains c*c' ll'-bit sub-memory blocks.

Figure 12A:
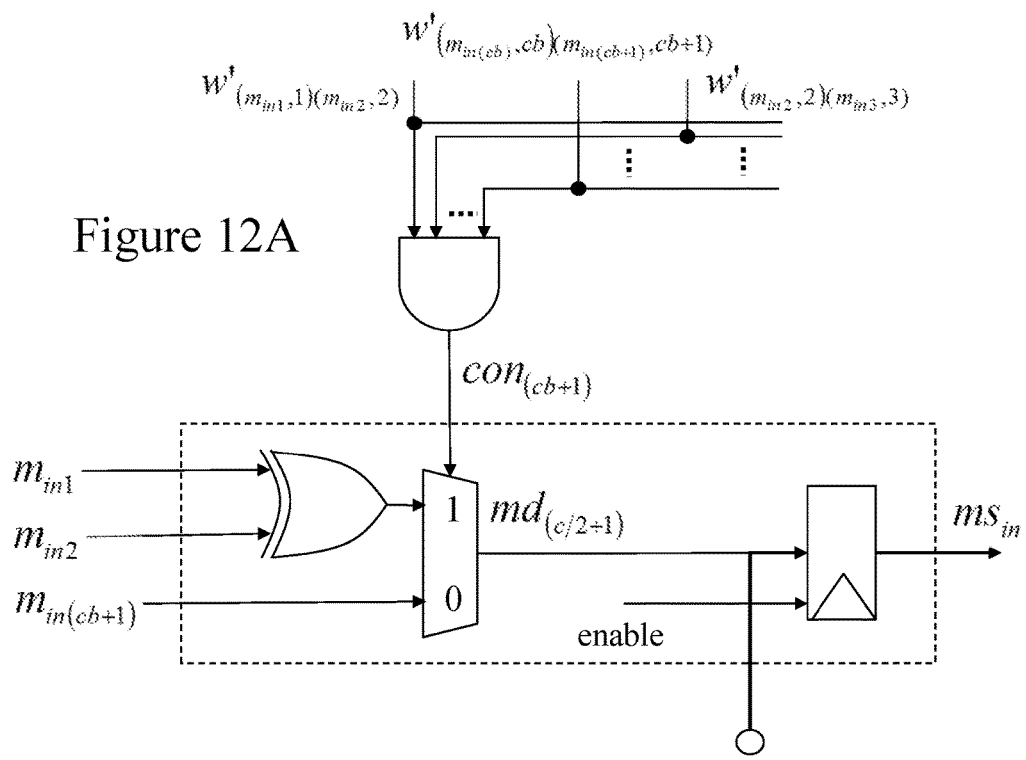
FIGS. 12A and 12B depict circuits schematics for input replacement based upon ILSW and dummy generator based upon MILSW forming portions of IP lookup engines according to the second implementation architecture in FIG. 10 for ILSW and MILSW variants.
Figure 12B:
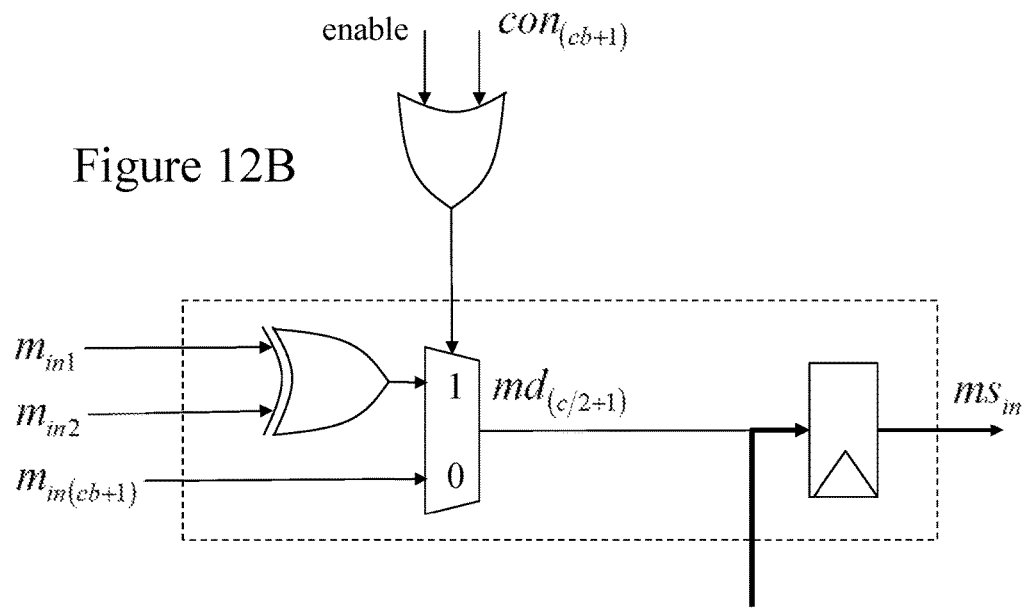

Both the ILSW and the MILSW use the same memory block. In the storing process, suppose that the stored connections are preliminarily generated in an external processing unit (e.g. a central processing unit (CPU) or microprocessor). In Local storing, l bits of $\omega'_{(i,j)(i',j')}$ are serially sent from the CPU and are stored in the SRAM shown in FIG. 11A, where it takes at least l clock cycles to store all $w'_{(i,j)(i',j')}$ depending on the number of inputs/outputs (I/Os) of the implemented semiconductor circuit. In Global storing, it also takes at least 1 clock cycles to store all $\omega_{(i1,j1)(i2,j2)}$ In the retrieving process for the MLS, an input address $m_{in}$ is partitioned into c sub-addresses and the corresponding connections are read in (11). FIG. 12A depicts a circuit diagram of the input-replacement module based on the ILSW. The updated input address ($ms_{in}$) is generated using the stored connections read from the MLS in (12) at the first clock cycle. At the second clock cycle, a flip-flop is enabled to store $ms_{inj1}$ and transfers it to the MGS. FIG. 12B depicts a circuit diagram of the dummy generator for the MILSW. Accordingly, $ma_{inj1}$ is generated before $ms_{inj1}$ in (16) at the first clock cycle and is transferred to the MGS using the same path of $ms_{inj1}$ at the second clock cycle. At the 3rd clock cycle, $ms_{inj1}$ is transferred to the MGS. Hence, $\omega_{(i1,j1)(i2,j2)}$ are read twice from the MGS using $ma_{inj1}$ and then $ms_{inj1}$.

Figure 13A:
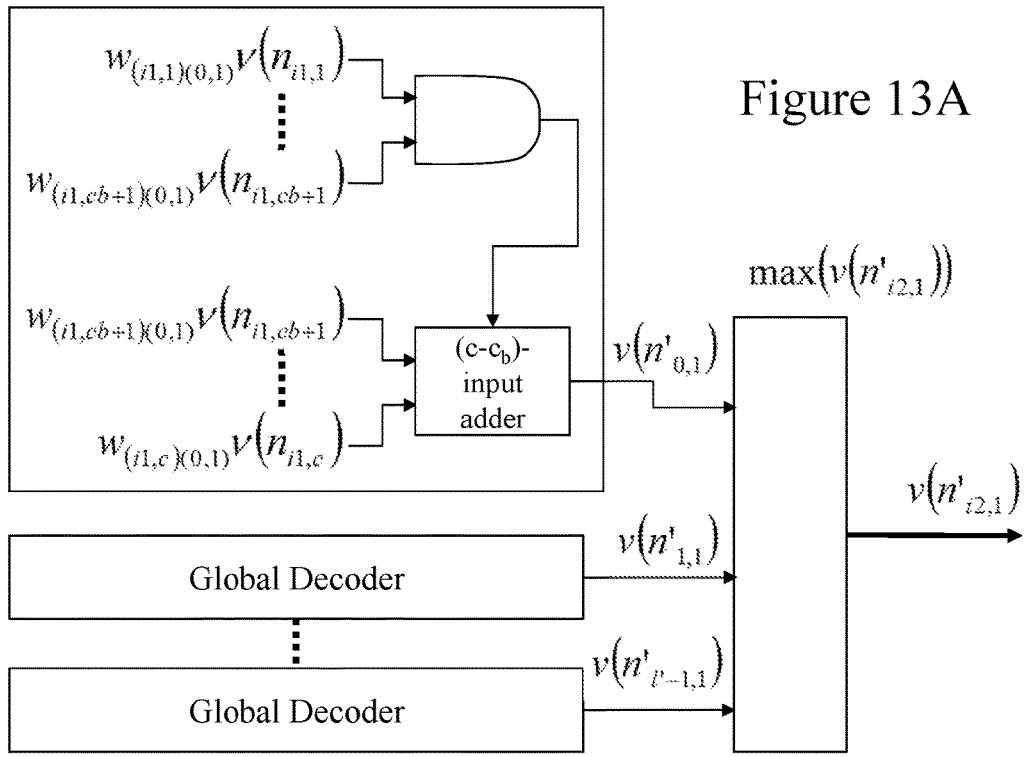
FIGS. 13A and 13B depict circuits schematics for decoding modules based upon ILSW and MILSW respectively forming portions of IP lookup engines according to the second implementation architecture in FIG. 10 for ILSW and MILSW variants.
Figure 13B:
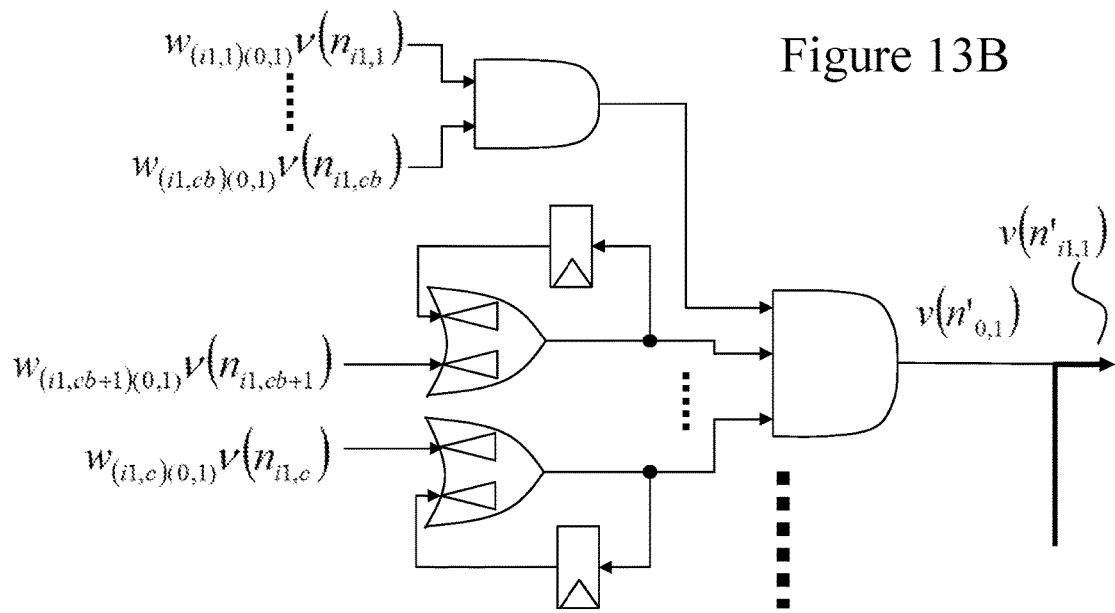

Now referring to FIG. 13A there is depicted the decoding module based on the ILSW which operates at the 2nd clock cycle. Using the connections read from the MGS, (13), (14) and (15) are calculated using a $c_b$-input AND gate and a $(c-c_b)$-input adder. Then, only activated output neuron or neurons are selected using a max function in (5) and (6). FIG. 13B depicts the corresponding decoding module based on the MILSW that operates at the 2nd and the 3rd clock cycles. As $\omega_{(i1,j1)(i2,j2)}$ is read twice from the MGS, the word selected by $ma_{inj1}$ is stored in registers and then is ORed with the word selected by $ms_{inj1}$.

FIG. 14A depicts a circuit diagram of the ambiguity elimination block. This block is identical for both the ILSW and the MILSW and consists of q TCAM words (e.g. q=20) that contain the ambiguous entries ($m_c$). The value of q is larger than or equal to the maximum number of ambiguous entries. In the storing process, suppose that $m_e$ and the corresponding output ports ($m'_c$) are sent from a CPU and are stored in the TCAM and registers, respectively. In the retrieving process, $m_{in}$ is searched in the TCAM and a matched word is found when the ILSW (MILSW) generates multiple output ports. The matched word selects its corresponding port from the registers through a one-hot encoder and a multiplexer and then $m_{out}$ is transferred to an output selector shown in FIG. 14B. The signal (mismatch) is low when the matched word is found in the TCAM and high when it is not found. If the matched word is found, $m_{out}$ is selected as an output port in the output selector. Otherwise, the output port is selected from the global decoding module.

5. Evaluation 5.1. Number of Ambiguous Entries

Figure 15:
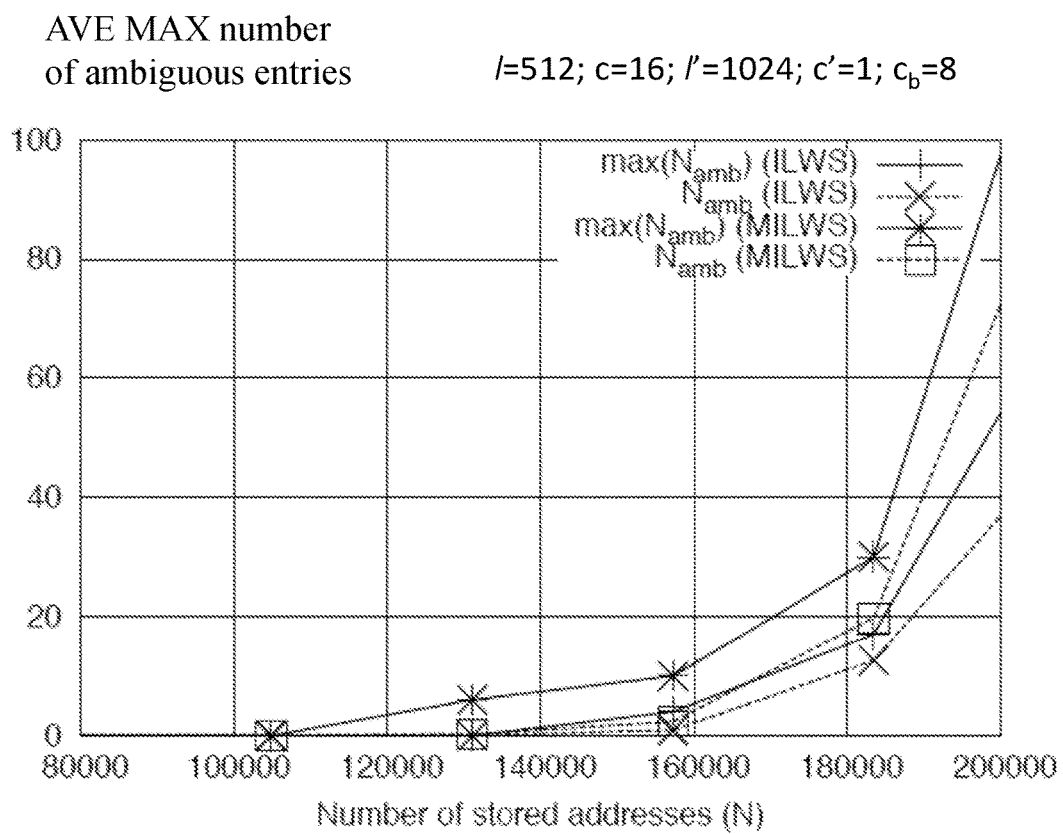
FIG. 15 depicts the average and maximum number of ambiguous entries versus the number of stored addresses for ILSW and MILSW IP lookup engines according to embodiments of the invention.

Depicted in FIG. 15 are the average ($N_{amb}$) and the maximum number (max($N_{amb}$)) of the ambiguous entries versus the number of stored addresses (N) in the ILSW and the MILSW. Again it is noted that an ambiguous entry activates more than one output neuron. The same parameters as employed in FIG. 7 were used, where $c_b$=8. These results are obtained using simulations, where each simulation point uses 12,000 trials to calculate $N_{amb}$, and max($N_{amb}$). $N_{amb}$ increases with increasing N because it increases the density. The ILWS has lower $N_{amb}$ than that of the MILWS. The reason for this being that the MILWS may "wrongly" activate additional dummy neurons in (16).

Figure 16:
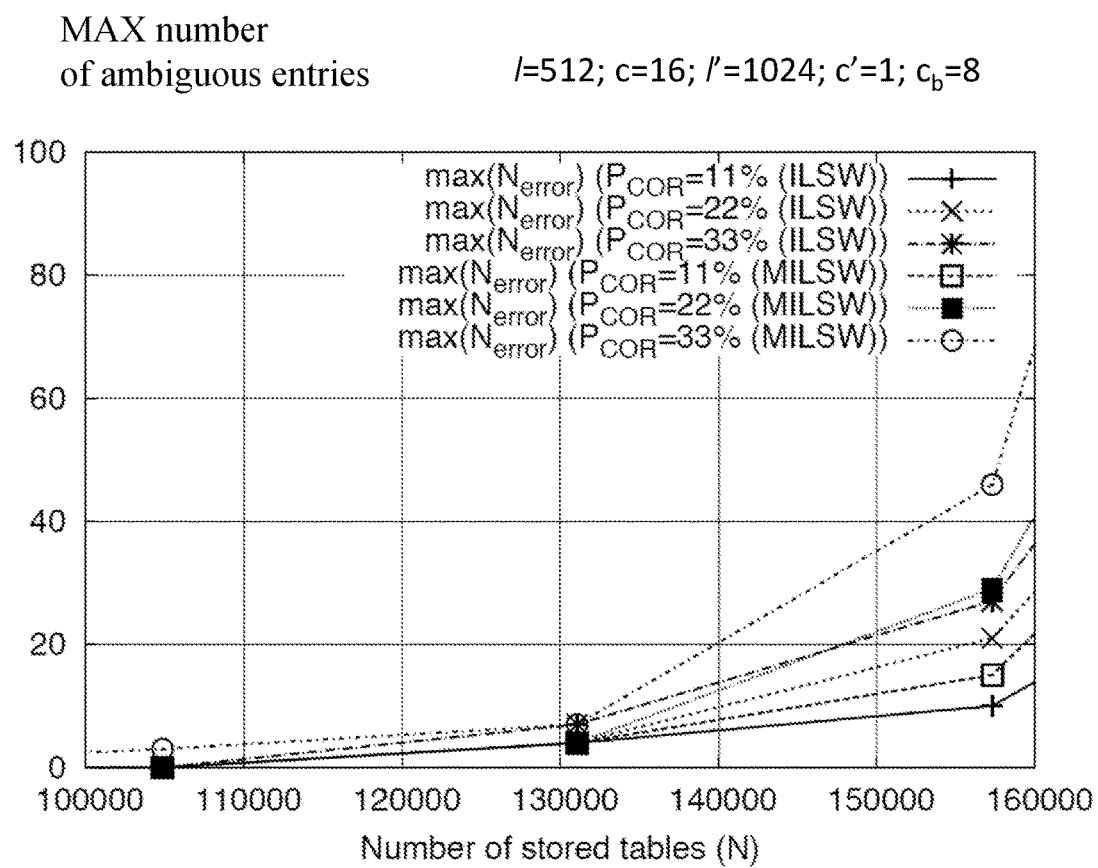
FIG. 16 depicts the maximum $N_{error}$ versus number of stored tables (N) with correlated table patterns for ILSW and MILSW IP lookup engines according to embodiments of the invention.

Referring to FIG. 16 the max($N_{error}$) versus N is plotted when stored addresses are correlated. $P_{COR}$ is the number of correlated bits divided by the total number of bits at the first two sub-addresses expressed as a percentage. The simulation conditions are the same as the previous simulation. A high $P_{COR}$ increases the number of shared connections among stored entries. max($N_{amb}$) increases as the number of shared connections is increased.

5.2 Hardware Results and Performance Comparisons of Embodiments of Invention

The proposed IP lookup engine described in respect of Section 4.2 Implementation 2 and FIGS. 10 to 14 respectively was designed based upon the Taiwan Semiconductor Manufacturing Company Ltd. (TSMC) 65 nm CMOS technology. The MLS and the MGS both exploit 15 SRAM blocks (256 kb) and 32 SRAM blocks (256 kb), respectively. The small TCAM in the compensation block has q=20 entries. For the purpose of comparison, a reference TCAM was also designed. The TCAM cell is designed using a NAND-type cell that consists of 16 transistors, as per Pagiamtzis et al in "Content-Addressable Memory (CAM) Circuits and Architectures: A Tutorial and Survey" (IEEE J. Solid State Circuits, Vol. 41, No. 3, pp. 712-'727). Each entry has 144 TCAM cells and is designed based on a hierarchy design style for high-speed matching operations, see for example Hanzawa et al in "A Large-Scale and Low-Power CAM Architecture featuring a One-Hotspot Block Code for IP-Address Lookup in a Network Router" (IEEE J. Solid State Circuits, Vol. 40, No. 4, pp. 853-861).

Referring to Table III performance comparisons under HSPICE simulation of the ILSW and MILSW with the reference TCAM design and that of a previous design embodiment of the inventors are presented, see Onizawa et al "Low-Power Area-Efficient Large-Scale IP Lookup Engine based on Binary Weighted Clustered Networks" (Proc. 50$^{th}$ IEEE Design Automation Conference, 2013, hereinafter Ozinawa2). The reference TCAM is designed to store 100,000 144-bit entries and is divided into 20 sub-TCAMs that each have 5,000 entries in order to achieve a power reduction for the search lines. A priority encoder attached to the TCAM has 100,000 inputs and 17-bit outputs.

For storing process, the previous implementation of the inventors, see Ozinawa2, and the IP lookup engines according to embodiments of the invention l=512 clock cycles to store all tables in the MLS and the MGS. The previous method has the probability of generating ambiguous output ports (<10$^{-8}$). The proposed methods according to embodiments of the invention remove the probability using the small TCAM. As the small TCAM can compensate up to q=20 error entries, N is increased by 83.5% and 70.0% based on the ILSW and the MILSW, respectively compared to the previous method.

For the retrieving process, in the ILSW, the worst-case delay is 1.31 ns in the block that includes the max-function block. This delay is 89.1% of the previous method (Ozinawa2) that includes an ambiguity checker after Global decoding. The delay of the max-function block is 65.8% of the whole delay. In the MILWS, as the max-function block is removed, the worst-case delay is 0.62 ns. As throughput may be defined by (address length)/(worst-case delay)/(retrieving clock cycles) the MILSW offers increased throughput compared to the previous method (Ozinawa2) and the ILSW.

However, the dynamic power dissipation of the MILSW is increased compared to that of the ILSW because the MILSW reads connections twice from the MGS. However, the energy dissipations of the ILSW and the MILSW are 2.7% and 4.8% of that of the reference TCAM which is significant. The main reason of the energy reduction is the use of SRAMs instead of the power-hungry TCAM based on the brute-force search. A lookup speed of the ILSW and the MILSW can be 229 Gb/s and 323 Gb/s over 40 Gb/s (OC-768) where the packet size is supposed to be 75 bytes. In terms of die footprint a further reduction is achieved as each TCAM cell contains 16 transistors while each SRAM cell contains 6 transistors. Accordingly, the required memory size of a CMOS implementation of a circuit operating according to an embodiment of the invention is 11.75 Mb, which 30.6% of the equivalent area of the reference TCAM design.

TABLE 3

Performance Comparisons

|  | Reference TCAM | Ozinawa2 | ILSW | MILSW |
|---|---|---|---|---|
| Number of Tables | 100,000 | 100,000 | 183,500 | 170,000 |
| Throughput (Gbps) | 52.0 | 48.3 | 54.8 | 77.7 |
| Dynamic Power (W) | 3.030 | 0.140 | 0.156 | 0.363 |
| Static Power (W) | 0.240 | 0.090 | 0.090 | 0.090 |
| Energy Metric (fJ/bit/search) | 0.584 | 0.028 | 0.016 | 0.028 |
| Probability of Generating Ambiguous Outputs | — | $10^{-8}$ | — | — |
| q (number of entries in TCAM) | — | 0 | 20 | 20 |
| Memory (Mb) | 14.4 (TCAM) |  | 11.75 (SRAM) |  |
| Equivalent Size (SRAM) (Mb) | 38.4 |  | 11.75 |  |
| Number of Transistors | 256M |  | 77M |  |

5.3 Performance Comparison Relative to Prior Art

Referring to Table 4 there are presented performance comparisons of embodiments of the invention with related works within the prior art. The design of Gamache is a straightforward implementation using TCAMs whilst Hayashi et al in "A 250-MHZ 18-Mb Full Ternary CAM with Low-Voltage Matchline Sensing Scheme in 65-nm CMOS" (IEEE J. Solid State Circuits, Vol. 48, No. 11, pp. 2671-2680) requires a very large (18 Mb) memory implementation under a 65 nm CMOS technology. In contrast Noda employs eDRAMs to reduce the size of TCAM cells for low power dissipation, however this tends to be a complex process. In Maurya several entries are shared using special-purpose CAM cells to reduce the number of entries required whilst Kuroda realizes the prefix match by reading candidates from eDRAMs, thereby yielding an energy metric which is very small. However, as the memory size is $O(2^n)$ where n is the word length, this leads to an unacceptably large memory of 1,039 Mb for long words (e.g. 144 bits). The trie-based method of Bando (PC trie-4) realizes a memory-efficient IP lookup engine using a prefix-compressed trie and also uses a hash function to reduce memory accesses to off-chip memory in order to achieve high throughput. Hasan exploits a hash-based method which reduces power dissipation using a collision-free hash function compared with the TCAM in Gamache. Compared with these methods, the IP lookup engines ILSW and MILSW according to an embodiments of the invention realize low energy metrics while dealing with large number of long entries and also achieving high throughout and small die footprint through a reasonable memory size.

It would be evident to one skilled in the art that small die footprints equate to reduced die costs thereby reducing the cost of an IP lookup engine according to an embodiment of the invention. Beneficially low cost TCAMs and IP lookup engines implemented according to embodiments of the invention would therefore not only allow for their deployment within a variety of other applications where to date they have not been feasible due to cost but also others where their deployment had not been previously considered. For example, low cost TCAMs would enable routers to perform additional functions beyond address lookups, including, but not limited to, virus detection and intrusion detection.

TABLE 4

Performance Comparison of Embodiment of the Invention with Prior Art

|  | TCAM1 | TCAM2 | DTCAM | IPCAM | eDRAM | Trie | Hash | MILSW |
|---|---|---|---|---|---|---|---|---|
| Length (bits) | 512 | 72 | 144 | 32 (128) (Note 1) | 23 | 63 | 32 | 144 |
| No. of Entries | 21,504 | 262,144 | 32,768 | 65,536 (Note 2) | $16 \times 10^6$ | 318,043 | 524,288 | 170,000 |
| Throughput (Gbps) | 76.8 | 18 | 20.6 | 32 | 4.6 | 12.6 | 6.4 | 77.7 |
| e | 12.26 | 9.6 | 2.0 | 7.33 | 0.6 | — | 5.5 | 0.363 |
| Energy Metric | 5.53 | 1.98 | 2.96 | 0.159 | 0.007 | — | 1.64 | 0.028 |
| Memory (Mb) | 10.5 | 18 | 4.5 | 2 | 432 | 31.19 | 60 | 11.75 |
| Equiv. Size SRAM (Mb) | 28 | 48 | — | 7.33 | — | — | — | — |

TABLE 4-continued

Performance Comparison of Embodiment of the Invention with Prior Art

|  | TCAM1 | TCAM2 | DTCAM | IPCAM | eDRAM | Trie | Hash | MILSW |
|---|---|---|---|---|---|---|---|---|
| Equiv. Size for 144-bit Length (Mb) | 7.88 | 96 | 4.5 | 32.99 | $10^{39}$ | — | — | 11.75 |
| Technology (nm) | 130 | 65 | 130 | 65 | 40 | FPGA | 130 | 65 |

(Note 1): Method can be extended to 128 bits for IPv6
(Note 2): 1.38M - IPCAM word is approximately equivalent to 22 TCAM words.
Note 3:
TCAM1 - Gamache,
TCAM2 - Hayashi,
DTCAM - Noda,
IPCAM - Maurya,
EDRAM - Kuroda,
Trie - Bando,
Hash - Hasan Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

In addition to the IP lookup search engines and context driven search engines discussed supra other applications of embodiments of the invention include, but are no limited, CPU fully associative cache controllers and translation lookaside buffers, database search engines, database engines, data compression, artificial neural networks, and electronic intrusion prevention system.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing a look-up engine, the method comprising:
    a) providing N clusters forming a first predetermined portion of a network of nodes, each cluster comprising a first predetermined number of nodes and associated with a predetermined portion of a received electronic identity; and
    b) providing a rule cluster forming a second predetermined portion of the network of nodes, the rule cluster comprising a second predetermined number of nodes;
    wherein, the look up engine performs steps of:
    c) activating for each predetermined portion of the received electronic identity not comprising a wildcard a single neuron within the respective cluster of the N clusters, the single neuron activated in dependence upon the value of that predetermined portion of the electronic identity;
    d) activating for each predetermined portion of the received electronic identity comprising a wildcard a proxy neuron within the respective cluster of the N clusters, the proxy neuron selected by applying a predetermined mathematical process to a predetermined subset of the other predetermined portions of the electronic identity;
    e) activating a single neuron within the rule cluster with a rule associated with the received electronic identity; and
    f) executing a learning process for a plurality of received electronic identities wherein for each received electronic identity steps (c) to (e) are performed and the resulting connections between single neuron identities within each of the N clusters and the single neuron within the rule cluster are stored within a database.

2. The method according to claim 1, further comprising
    g) operating the network of nodes as one of a lookup generator and a rule generator.

3. The method according to claim 1, further comprising
    g) receiving an electronic identity and establishing an associated rule with the received electronic identity.

4. The method according to claim 1, further comprising
    g) receiving a rule and establishing either a single electronic identity without any wildcard or a set of electronic identities defined by an electronic identity which includes a wildcard.

5. The method according to claim 1, further comprising
    g) receiving an incomplete electronic identity and determining the complete address independence upon the data stored within the database relating to the plurality of electronic identities and rules.

6. The method according to claim 1, wherein each predetermined portion of the electronic identity is a characteristic and the rule is a classification such that the network of nodes acts a classifier.

7. The method according to claim 1, wherein the learning process comprises a local learning process and a global learning process.

8. A method for providing a look-up engine, the method comprising:
    a) providing N clusters forming a first predetermined portion of a network of nodes, each cluster comprising a first predetermined number of nodes and associated with a predetermined sub-message of a received electronic message; and
    b) providing a rule cluster forming a second predetermined sub-message of the network of nodes, the rule cluster comprising a second predetermined number of nodes;

wherein, the look up engine performs steps of:
c) performing a local learning process for each predetermined sub-message of a learnt electronic message wherein a single neuron within the respective cluster of the N clusters is activated in dependence upon the predetermined sub-message of the learnt electronic message unless the predetermined sub-message of the learnt electronic message is a wildcard wherein no neuron is activated;
d) performing a global learning process when a learnt message includes a wildcard wherein a dummy neuron is activated within the respective cluster of the N clusters associated with the predetermined sub-message of the learn electronic message comprising the wildcard, the dummy neuron selected by applying a predetermined mathematical process to a predetermined subset of the other predetermined sub-messages of the electronic message;
e) activating a single neuron within the rule cluster, the single neuron established in dependence upon a rule associated with the learnt electronic message; and
f) storing the connections between the activated nodes within the N clusters and the rule cluster within a memory.

9. The method according to claim 8, further comprising:
g) performing a retrieval process for a received electronic message comprising the steps of:
    h) parsing the received electronic message into the sub-messages;
    i) establishing for each sub-message a neuron to activate within the associated cluster of the N clusters wherein if the sub-message has not been stored it is replaced with a dummy message;
    j) establishing the connections between the activated nodes within the N clusters; and
    k) retrieving from the memory the identity of a neuron which would be activated within the rule cluster in dependence upon the established connections; and
    l) associating a rule with the identified neuron in the rule cluster.

10. The method according to claim 8, further comprising
g) performing a retrieval process for a rule comprising the steps of:
    h) associating an activated neuron within the rule cluster of nodes associated with the rule;
    i) retrieving the connections between activated nodes within the N clusters associated with the activated neuron;
    j) associating with the retrieved connections the activated nodes within the N clusters;
    k) associating a sub-message with each activated neuron in each cluster of the N clusters; and
    l) generating a message from the sub-messages associated with the N clusters.

11. A device comprising:
a look up engine for establishing a rule associated with an electronic identity comprising:
    a) providing N clusters forming a first predetermined portion of a network of nodes, each cluster comprising a first predetermined number of nodes and associated with a predetermined portion of a received electronic identity; and
    b) providing a rule cluster forming a second predetermined portion of the network of nodes, the rule cluster comprising a second predetermined number of nodes;

wherein, the look up engine executes a process comprising the steps of:
    c) activating for each predetermined portion of the received electronic identity not comprising a wildcard a single neuron within the respective cluster of the N clusters, the single neuron activated in dependence upon the value of that predetermined portion of the electronic identity;
    d) activating for each predetermined portion of the received electronic identity comprising a wildcard a proxy neuron within the respective cluster of the N clusters, the proxy neuron selected by applying a predetermined mathematical process to a predetermined subset of the other predetermined portions of the electronic identity;
    e) activating a single neuron within the rule cluster with a rule associated with the received electronic identity; and
    f) executing a learning process for a plurality of received electronic identities wherein for each received electronic identity steps (c) to (e) are performed and the resulting connections between single neuron identities within each of the N clusters and the single neuron within the rule cluster are stored within a database.

12. The device according to claim 11, wherein the look-up engine further comprises:
    1) a message port for receiving a set of k learning messages and a rule port for receiving a set of k rules;
    2) a local learning circuit coupled to the message port comprising a $((c-1) \cdot l^2)$-bit static random access memory (SRAM) memory block 1 for storing results of a local learning process applied to the set of k learning messages each composed of c sub-messages $m_{k1} \ldots m_{kc}$ and length $c \cdot \log_2 l$; and
    3) a global learning circuit comprising at least a dummy generator coupled to the message port and a $c' \cdot l \cdot l'$-bit SRAM memory block 2 coupled to the rule port for storing results of a global learning process applied to a set of k learning rules each composed of c' sub-messages $m'_{k1} \ldots m'_{kc'}$ and length $c' \cdot \log_2 l'$.

13. The device according to claim 11, wherein the look-up engine is trained by providing a training set of the set of k learning messages and the set of k rules such that:
    4) each interconnection between a sequential pair of sub-messages for a learning message is stored within memory block 1 when neither of the sequential pair of sub-messages are a wildcard; and
    5) each interconnection between a dummy message generated by the dummy generator by applying a predetermined process to pre-determined sub-messages of a learning message and a predetermined sub-message of the rule associated with the message are stored within memory block 2 when at least one of a sequential pair of messages is a wildcard.

14. The device according to claim 11, wherein the look-up engine further executes a retrieval process comprising the steps of:
    g) applying an input message partitioned into c sub-messages to an input port coupled to the memory block 1 and a first input selector circuit; wherein
    6) the input selector circuit reads connections between sequential pairs of sub-messages of the input message from memory block 1;
    7) provides a first output to memory block 2 when one or more connections are not found which comprises an output message generated by replacing one or more sub-messages within the input message with a wildcard;

8) provides an indication of the rule associated with the connections between the sub-messages of the input message to a second input selector; and 9) the second input selector circuit reads connections between sequential pairs of sub-messages of the output message from memory block 2 and receives the indication of the rule and generates in dependence thereof the rule associated with the input message which is either the received indication of the rule or a new rule associated with the connections between the sub-messages of the output message.

15. The device according to claim 11, wherein the look-up engine further comprises:

1) a message port for receiving a set of k learning messages and a rule port for receiving a set of k rules;

2) a local learning SRAM memory for storing connections arising from a local learning process applied to the set of k learning messages each composed of c sub-messages $m_{k1} \ldots m_{kc}$ and length $c \cdot \log_2 l$; and 3) a global learning SRAM memory for storing connections arising from a global learning process applied to the set of k learning messages and a set of k learning rules each composed of c' sub-messages $m'_{k1} \ldots m'_{kc'}$ and length $c' \cdot \log_2 l'$.

16. The device according to claim 11, wherein the look-up engine further executes a retrieval process comprising the steps of:

g) applying an input message partitioned into c sub-messages to an input port coupled to the memory block 1 and a first input selector circuit; wherein 10) generating an updated input message using stored connections within the local learning memory between sequential pairs of sub-messages of the input message;

11) transferring to a second memory the updated input message;

12) generating an output comprising a rule using stored connections within the global learning memory between sequential pairs of sub-messages of the updated input message; and 13) determining whether to use the output as the rule for the input message or an output from an ambiguity elimination circuit also receiving the input message.

17. The device according to claim 16, wherein the ambiguity elimination circuit employs a Ternary Content-Addressable Memory (TCAM).

* * * * *